United States Patent [19]

Watanabe et al.

[11] Patent Number: 5,446,810
[45] Date of Patent: Aug. 29, 1995

[54] OPTICAL SWITCH, OPTICAL FIBER ARRANGING MEMBER AND METHOD OF MANUFACTURING THE OPTICAL FIBER ARRANGING MEMBER

[75] Inventors: Tsutomu Watanabe; Kazuhito Saito; Kazumasa Ozawa; Shunichi Mizuno, all of Yokohama; Izumi Sankawa, Mito, all of Japan

[73] Assignees: Sumitomo Electric Industries, Ltd., Osaka; Nippon Telegraph & Telephone Corporation, Tokyo, both of Japan

[21] Appl. No.: 61,105

[22] Filed: May 14, 1993

[30] Foreign Application Priority Data

| May 15, 1992 | [JP] | Japan | 4-123750 |
| Jun. 16, 1992 | [JP] | Japan | 4-156667 |
| Jun. 16, 1992 | [JP] | Japan | 4-156669 |
| Jan. 13, 1993 | [JP] | Japan | 5-004229 |
| Apr. 30, 1993 | [JP] | Japan | 5-104665 |

[51] Int. Cl.[6] .................................................. G02B 6/26
[52] U.S. Cl. ......................................... 385/22; 385/20; 385/137
[58] Field of Search ................. 385/16, 17, 20–23, 385/134, 137

[56] References Cited

U.S. PATENT DOCUMENTS

| 4,445,752 | 5/1984 | Faber et al. | 385/22 |
| 4,652,081 | 3/1987 | Fatatry | 385/22 |
| 4,750,804 | 6/1988 | Osaka et al. | 385/137 X |
| 5,000,532 | 3/1991 | Kraetsch et al. | 385/16 |
| 5,024,497 | 6/1991 | Jebens | 385/16 |
| 5,175,776 | 12/1992 | Lee | 385/16 |

FOREIGN PATENT DOCUMENTS

| 0410181 | 1/1991 | European Pat. Off. |
| 2170615 | 8/1986 | United Kingdom |
| 9205460 | 4/1992 | WIPO |

OTHER PUBLICATIONS

Schroeder, "Accurate Silicon Spacer Chips for an Optical-Fiber Cable Connector", Bell System Technical Journal, vol. 57, No. 1, Jan. 1978, New York, pp. 91–97.
Patent Abstracts of Japan, vol. 16, No. 121 (P-1329) 26 Mar. 1992 & JP-A-32 87 212 (Sumitomo) 17 Dec. 1991.
Patent Abstracts of Japan. vol. 9, No. 48 (P-338) 28 Feb. 1985 & JP-A-59 185 301 (Nippon Denshin Denwa Kosha) 20 Oct. 1984.

Primary Examiner—John D. Lee
Attorney, Agent, or Firm—Cushman Darby & Cushman

[57] ABSTRACT

The present invention relates to an optical switch comprising a fiber arranging member having a substrate 1 with a plurality of fiber fixing grooves formed in an upper surface thereof, first optical fibers 2 fixed in the fiber fixing grooves, and a convey mechanism 5 for conveying a second optical fiber 6 to be connected to a corresponding first optical fiber 2 to a corresponding fiber fixing groove, wherein fiber introduction grooves 1h for guiding the end portion of the second optical fiber 6 are formed at the end portions of the fiber fixing grooves that fix the end portions of the first optical fibers 2.

23 Claims, 16 Drawing Sheets

A-A'

B-B'

OPTICAL SWITCH, OPTICAL FIBER ARRANGING MEMBER AND METHOD OF MANUFACTURING THE OPTICAL FIBER ARRANGING MEMBER

BACKGROUND OF THE INVENTION

1. Field of the Invention

The present invention relates to an optical switch and an optical fiber arranging member used in this optical switch, and a method of manufacturing the same.

2. Related Background Art

An optical scan switch, which has a connector table constituted by arranging a plurality of connectors in a matrix manner and which is to be connected to a two-dimensionally movable master connector ("C-449 10-core 1×1,000 Optical Scan Switch", the Institute of Electronics, information, Communication Engineers of Japan, Spring National Meeting (1989), P. 4–238), is known.

In the conventional connector table, however, since the two-dimensional array of optical fibers is constituted by physically arranging a large number of connectors, the optical fibers held by different connectors are not arranged at high precision; therefore they cannot be connected to optical fibers held by a master connecter at high precision.

SUMMARY OF THE INVENTION

It is an object of the present invention to provide an optical switch whose optical fibers have high positional precision and an optical fiber arranging member used in this optical switch, and a method of manufacturing the same.

In order to achieve the above objectives, an optical switch is provided according to the present invention which comprises a means for arranging members, each of the members having first optical fibers, a convey mechanism for conveying at least one second optical fiber to each of the first optical fibers of the arranging means to connect the second optical fiber with the first optical fiber, and a means for introducing the second optical fiber to the first optical fiber with fiber introduction grooves for guiding an end portion of the second optical fiber to the first optical fiber.

The arranging means may have an optical fiber arranging member for arranging a plurality of optical fibers, wherein the fiber arranging member has first optical fibers that are arranged linearly or planarly, and fiber introduction grooves for guiding an end portion of the second optical fiber. The fiber introduction grooves may be formed ahead of end portions of the first optical fibers.

The above fiber arranging member may also comprise a substrate having a plurality of fiber fixing grooves formed in an upper surface thereof, and the first optical fibers fixed in the fiber fixing grooves.

The fiber fixing grooves and the fiber introduction grooves may constitute integrally formed, substantially V-grooves.

A guide serving as a reference to position and fix the fiber introduction grooves may be formed in the fiber arranging member.

The above fiber arranging member may comprise a member in which a plurality of fiber fixing holes are formed, and the first optical fibers fixed in the fiber fixing holes.

A guide means serving as a reference to position and fix the fiber fixing holes and the fiber introduction grooves may be formed.

According to the present invention, there is provided an optical fiber arranging member in which fiber fixing means having grooves or holes and fiber introduction grooves are formed in the same member and a plurality of optical fibers are fixed to the fiber fixing means, wherein a slit is present between the fiber fixing means and the fiber introduction grooves.

According to the present invention, there is also provided a method of manufacturing an optical fiber arranging member in which fiber fixing grooves and fiber introduction grooves are integrally formed to arrange a plurality of optical fibers, comprising the steps of: forming a plurality of grooves parallel to each other in a substrate; respectively fixing optical fibers to parts of the grooves with an adhesive; and cutting end portions of the optical fibers together with side walls of the grooves, thereby forming, in the substrate, a slit separating the grooves in a direction perpendicular to a longitudinal direction of the grooves.

According to the present invention, there is also provided a method of manufacturing an optical fiber arranging member in which fiber fixing holes and fiber introduction grooves are formed in the same member to arrange a plurality of optical fibers, comprising the steps of: forming a plurality of holes in the member; respectively forming fiber introduction grooves by exposing parts of the holes; respectively fixing optical fibers to other parts of the holes with an adhesive; and cutting end portions of the optical fibers together with side walls of the holes, thereby forming, in the member, a slit separating the holes and the fiber introduction grooves in a direction perpendicular to a longitudinal direction of the holes.

According to the present invention, there is also provided an optical fiber arranging member for arranging a plurality of optical fibers, comprising guide means, formed on two sides of fiber fixing means, for serving as a reference to position fiber introduction grooves, a fiber introduction substrate having fiber introduction grooves and guide means at positions respectively corresponding to the fiber fixing means and the guide means of the member, and guide pins to be engaged with the guide means of the fiber arranging member and the guide means of the fiber introduction groove substrate, thereby bonding the fiber arranging member and the fiber introduction groove substrate such that the plurality of fiber fixing means and the fiber introduction grooves coincide.

According to the present invention, there is also provided a method of manufacturing an optical fiber arranging member for arranging a plurality of optical fibers, comprising the steps of: forming a plurality of first grooves in one substrate; forming second grooves on both sides of the first grooves; cutting the substrate in a direction perpendicular to the first and second grooves, thereby dividing the substrate into two substrates; and engaging guide pins with guide grooves in the two substrates, thereby bonding the two substrates such that the first and second grooves coincide.

According to the present invention, there is also provided a method of manufacturing an optical fiber arranging member for arranging a plurality of optical fibers, comprising the steps of: forming a plurality of first holes in one member; forming second holes on both sides of the first holes; cutting the member in a direction perpendicular to the first and second holes, thereby dividing the member into two members; forming fiber introduction grooves in one of the two divided members by exposing at least parts of the first holes; and engaging guide pins in guide holes formed in parts of the holes in the two members, thereby bonding the two members such that the first and second holes coincide.

According to the first aspect of the present invention described above, since a plurality of fiber fixing grooves or fiber fixing holes are formed in the same substrate, the shape and interval of the fiber fixing grooves or fiber fixing holes are defined at high precision. Since the optical fibers are connected through fiber introduction grooves adjacent to the fiber fixing grooves or fiber fixing holes, the end portion of a second optical fiber introduced into the corresponding fiber introduction groove can be reliably connected to the corresponding first optical fiber.

Further, in order to achieve the above objectives, according to the second aspect of the present invention, there is provided an optical switch for causing a plurality of first optical fibers having a predetermined arrangement and a second optical fiber to oppose each other. Moreover, the second optical fiber can be moved to perform switching between the second and first optical fibers. The optical switch comprises an optical fiber arranging member which has first and second fiber fixing grooves, extending in a direction perpendicular to a longitudinal direction of a slit formed in an upper surface of a substrate to sandwich the slit, the grooves having coincident extending lines in a longitudinal direction thereof, wherein the optical fibers are fixed in the first fiber fixing grooves such that distal end faces thereof oppose the slit, and conveying means for conveying the second optical fiber to the second fiber fixing grooves.

A plurality of stages of optical fiber arranging members may be provided at a predetermined stacking interval, and the conveying means may include a moving mechanism for moving the master optical fiber to the second fiber fixing grooves of the optical fiber arranging member of each stage.

The bottom surface of the slit is preferably formed to be deeper than the bottoms of the first and second fiber fixing grooves.

The distal end of the master optical fiber may be located in the slit not to contact the optical fibers in the first fiber fixing grooves.

A condenser lens may be provided at the distal end of the master optical fiber located in the slit. Alternatively, the edge of the distal end face of the fiber may be spherically formed by heat fusion.

According to the second aspect of the present invention described above, since the plurality of fiber fixing grooves are formed in one substrate, the shape and interval of the fiber fixing grooves are defined at high precision. Dust that comes flying to the distal end portions of the optical fibers fixed in the first fiber fixing grooves is immediately removed from the substrate through the slit and will not attach to the distal ends of the optical fibers. Therefore, connecting losses between opposite optical fibers will not be increased.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENTS

Optical switches according to the embodiments of the present invention will be described with reference to the accompanying drawings of FIGS. 1 to 26.

First, the optical switch according to the first embodiment will be explained with reference to the FIGS. 1 to 3.

Figure 1:
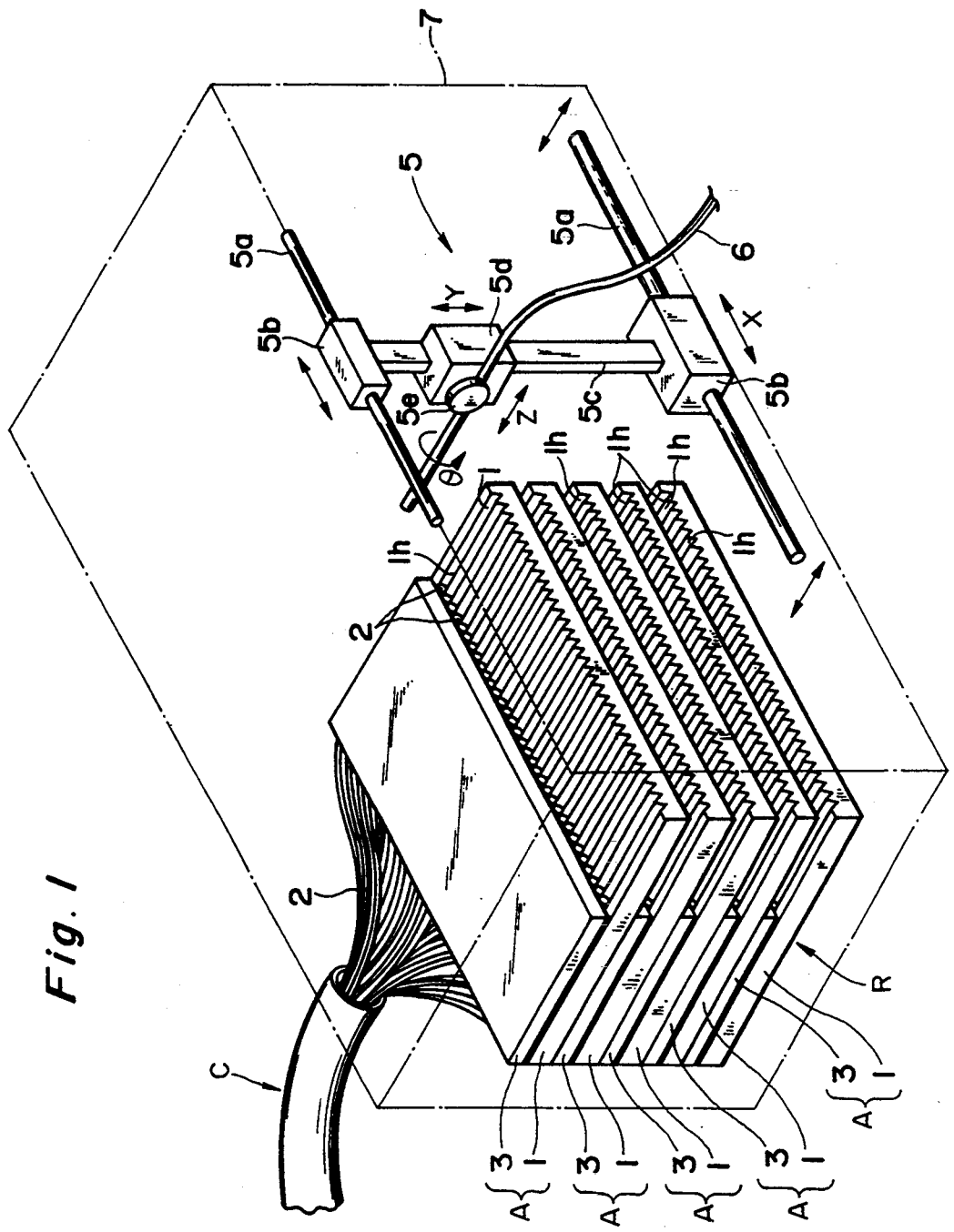
FIG. 1 is a perspective view of an optical switch according to the first embodiment of the first aspect of the present invention.

As shown in FIG. 1, the optical switch of this embodiment is constituted to include substrates 1, optical fibers (first optical fibers) 2, cover plates 3, fiber introduction grooves 1h, and a convey mechanism 5. Each substrate 1, and the corresponding optical fibers 2 and cover plate 3 are constituent components of one fiber array unit A. A fiber arranging member is formed with stacking a plurality (e.g., 12 stages of) of fiber array units A.

A large number (e.g., 80) of fiber fixing grooves (to be referred to as first V-grooves hereinafter) 1g are formed in the upper surface of each substrate 1 parallel to each other at a predetermined pitch interval (e.g., 0.25 mm) from a reference end face R thereof (shown in FIGS. 2 and 3). Since the substrates 1 are made of a semiconductor material, e.g., silicon, to have the same shape and size, the distances between the reference end face R and the respective first V-grooves 1g of each substrate 1 coincide among the respective substrates, and are the same throughout all the substrates 1.

One first optical fiber 2 supplied from an optical cable C is inserted midway along each first V-groove 1g. Therefore, an area in which the first optical fiber 2 is not inserted is postioned ahead of an end portion 2a of this first optical fiber 2, and this area functions as a fiber introduction groove (to be referred to as a second V-groove hereinafter) 1h. Since the respective first optical fibers 2 are in contact with the side walls of the bottom portions of the corresponding V-grooves and this state is held by an adhesive, the distances between the upper surface of the substrate 1 and the first optical fibers 2 are the same.

The cover plate 3 made of silicon is bonded to the upper surface of each substrate 1 to protect the first optical fibers 2 fixed in the first V-grooves 1g. As the cover plate 3 is bonded to the substrate 1 such that the end portions of the first optical fibers 2 are exposed, no problems arise in connection of the first optical fibers 2 to a second optical fiber 6. The first optical fibers 2 are fixed on the bottom portions of the V-grooves having a size to sufficiently bury them, so that the cover plate 3 is bonded to the upper surface of the substrate 1 in a state close to surface contact. The bonding shapes of the substrates 1 in the fiber array units A are identical. For example, the distance between the reference end face R of the substrate 1 and a 10th optical fiber thereof counted from the reference end face R is the same in any fiber array unit A.

In this embodiment, as the plurality of fiber array units A are stacked to have their reference end faces R flush, the distance between the reference end face R and an arbitrary first optical fiber 2 from the reference end face R of a given fiber array unit is equal to that of any other fiber array unit. These plurality of identical substrates can be easily manufactured by forming a plurality of V-grooves in one elongated substrate in the longitudinal direction thereof with a diamond cutter or the like and cutting this substrate in a direction perpendicular to the longitudinal direction. These plurality of identical substrates can also be manufactured at high precision by a photoetching technique.

The interval of the optical fibers in a direction perpendicular to the upper surface of the substrate 1 is changed in accordance with variations in thickness of the material to be used. When a semiconductor, e.g., a silicon wafer, is used, the variation is the same in units of lots and thus can be managed at a precision of about 1 $\mu$m. Therefore, no problem arises in practice.

The convey mechanism 5 is arranged ahead of the optical fiber arranging members. The convey mechanism 5 has two linear guide rails 5a arranged to extend in the X direction, two linear guide bearings 5b movable in the X direction along the linear guide rails 5a, a linear guide rail 5c held by the linear guide bearings 5b and arranged to extend in the Y direction, a linear guide bearing 5d movable in the Y direction along the linear guide rail 5c, and a rotary disk 5e fixed to the linear guide bearing 5d for rotating the end portion of the optical fiber (second optical fiber) 6 along the Y-Z plane. A power transmission mechanism (not shown) by means of a ball screw or the like is provided along each axis. Therefore, the second optical fiber 6 can be conveyed to an arbitrary first V-groove 1g. The two linear guide rails 5a are fixed to a moving unit (not shown) movable in the Z direction, and the optical switch is housed in a rectangular housing member 7. The housing member 7 is filled with a matching oil, or anti-reflection films are deposited on the coupling end faces of the first and second optical fibers 2 and 6, so that the optical characteristics (e.g., a switching loss and a reflection loss) between the optical fibers in the switching operation are stabilized.

An optical fiber connecting method using the optical switch of this embodiment will be explained with reference to FIGS. 2 and 3.

Figure 2:
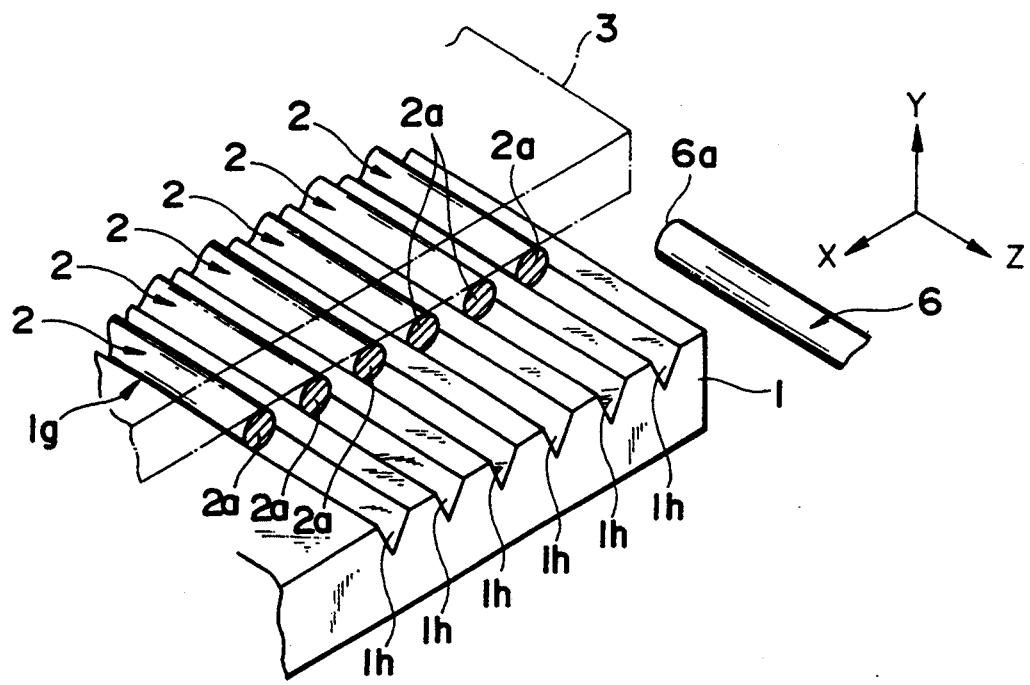
FIG. 2 is a perspective view of the main part of the optical switch of FIG. 1.

As shown in FIGS. 1 and 2, an end portion 6a of the second optical fiber 6 is maintained at the horizontal state by the rotary disk 5e. In this state, the convey mechanism 5 is driven to move the end portion 6a of the second optical fiber 6 to come close to a predetermined first V-groove 1g. Thereafter, the end portion 6a of the second optical fiber 6 is disposed immediately above the corresponding second V-groove 1h formed by part of the V-groove in which the first optical fiber 2 to be connected with this second optical fiber 6 is fixed (see FIG. 2). In this case, since the positional precision is moderated by the opening width of the V-groove in the upper surface of the substrate 1, alignment becomes easy. For example, when V-grooves are formed adjacent to each other at a pitch of 0.25 mm, the convey mechanism 5 may be driven such that the core center of the second optical fiber 6 is located within the opening width (0.25 mm) of the V-groove.

Figure 3:
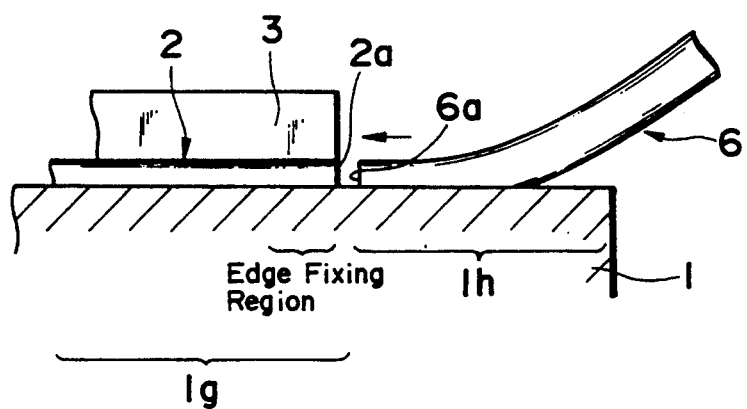
FIG. 3 is a side sectional view, seen from the arranging direction of fiber fixing grooves, for showing the connecting operation of the optical fibers of the optical switch of FIG. 1.

The rotary disk 5e is rotated counterclockwise (in the direction of an arrow in FIG. 1) to engage the end portion 6a of the second optical fiber 6 with the corresponding second V-groove 1h (See FIG. 3). As the second optical fiber 6 contacts the second V-groove 1h in an inclined state, reaction caused by the elastic deformation of the optical fiber acts on the distal end of the second optical fiber 6. As a result, the end portion 6a of the second optical fiber 6 is bent along the groove, and the reaction described above serves as a bonding force of the V-groove and the second optical fiber 6. A mechanism from which this rotating mechanism is omitted is also possible. When the optical fiber 6 is fixed in advance to be inclined downward and the linear guide bearing 5d is moved to the edge fixing region in the Z direction, a similar bent to that described above can be imparted to the second optical fiber 6.

Thereafter, the moving unit of the convey mechanism 5 is driven to move the second optical fibers 6 in the Z direction, thereby causing the end portion 6a of the second optical fiber 6 to abut against the end portion 2a of the first optical fiber 2 (See FIG. 3). By this operation, the second optical fiber 6 can be optically coupled to an arbitrary first optical fiber 2.

In this manner, according to the optical switch of this embodiment, since positioning of the second optical fiber 6 can be roughly performed, positioning becomes easy. As a connector ferrule is not used, the fiber array units A become compact to decrease the entire size of the apparatus.

Figure 4:
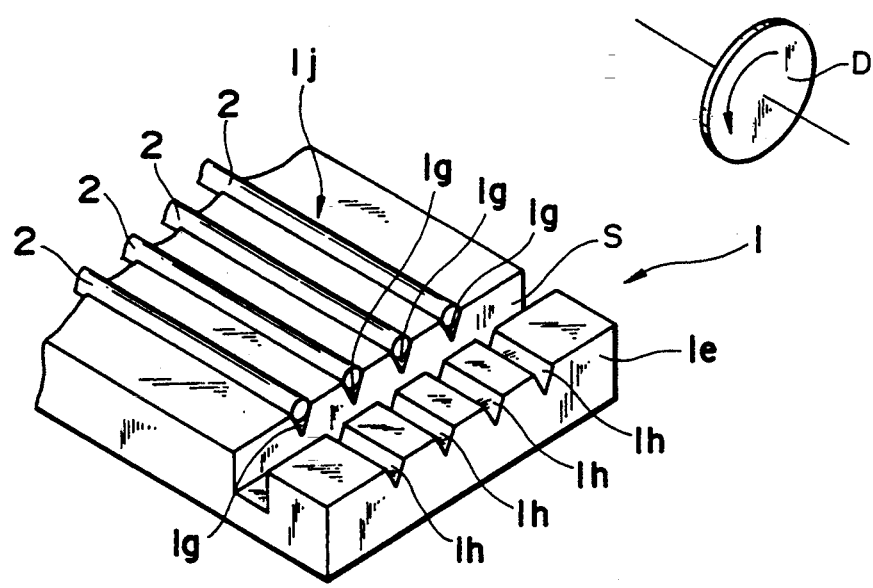
FIG. 4 is a perspective view of the main part of an optical fiber arranging member according to the second embodiment of the first aspect of the present invention.

An optical fiber arranging member according to the second embodiment will be described with reference to FIGS. 4, 5A, and 5B.

First, a method of manufacturing an optical fiber arranging member to be used for the optical switch described above will be explained. One Si substrate 1 is prepared. By using a diamond cutter having a sharp point, four first V-grooves (fiber fixing grooves) 1g are formed at a constant pitch interval to form a fiber fix portion 1j (FIG. 4). The depth of the first V-grooves 1g is determined by considering the outer diameter of first optical fibers 2.

Figure 5A:
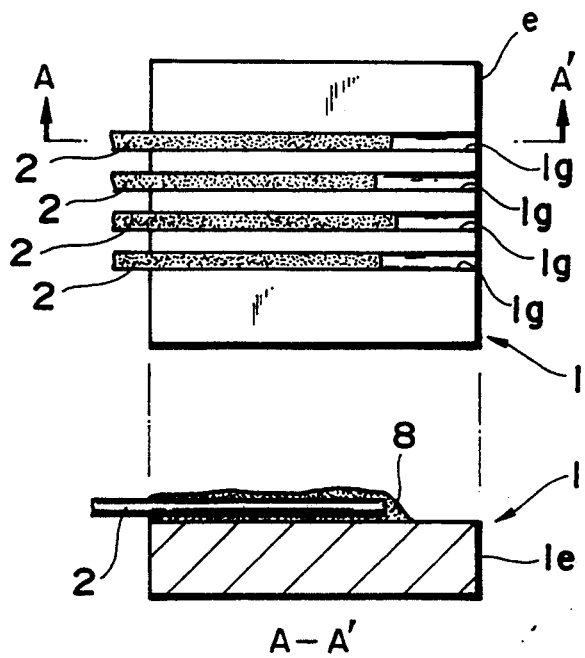
FIGS. 5A and 5B are views showing part of the manufacturing process of the optical fiber arranging member of FIG. 4.
Figure 5B:
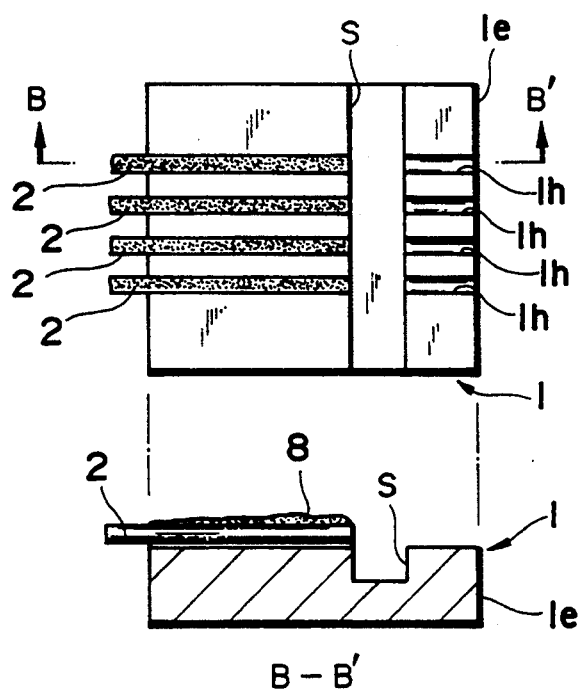

Next, the four first optical fibers 2 are inserted in the four first V-grooves and fixed with an adhesive 8 (FIG. 5A). In this case, the end portions of the first optical fibers 2 are disposed midway along the first V-grooves 1g so as not to reach an end face 1e of the substrate 1. For this reason, areas in which the first optical fibers 2 are not fixed are present in the first V-grooves 1g, and the adhesive 8 may sometimes partly attach to the first V-grooves 1g ahead of the end portions of the first optical fibers 2.

The end portions of the first optical fibers 2 and the upper surface of the substrate 1 are cut with a diamond blade D (shown in FIG. 4) along a direction perpendicular to the longitudinal direction of the first V-grooves 1g. As a result, a slit S to divide each of the plurality of first V-grooves 1g into two portions is formed in the upper surface of the substrate 1 (FIG. 5B). The extending lines of the first and second V-grooves 1g and 1h located on the both sides of the slit S coincide.

As the result of this cutting, the non-uniformities in end portions of the first optical fibers 2 are gone by the cutting width of the diamond blade D, so that the positions of the end faces of the first optical fibers 2 can be uniformly aligned at high precision. In addition, the excessive adhesive 8 (FIG. 5A) attaching to the first V-grooves 1g ahead of the first optical fibers 2 is removed.

This embodiment exemplifies a case wherein one fiber fix portion 1j is formed on the substrate 1. However, the number of fiber fix portions 1j can be two or more. For example, M fiber fix portions 1j each constituted by N first V-grooves 1g may be arranged in the same direction, and N optical fibers supplied from an N-core ribbon fiber may be fixed to each fiber fix portion 1j, so that M ribbon fibers are connected to one substrate.

Figure 6:
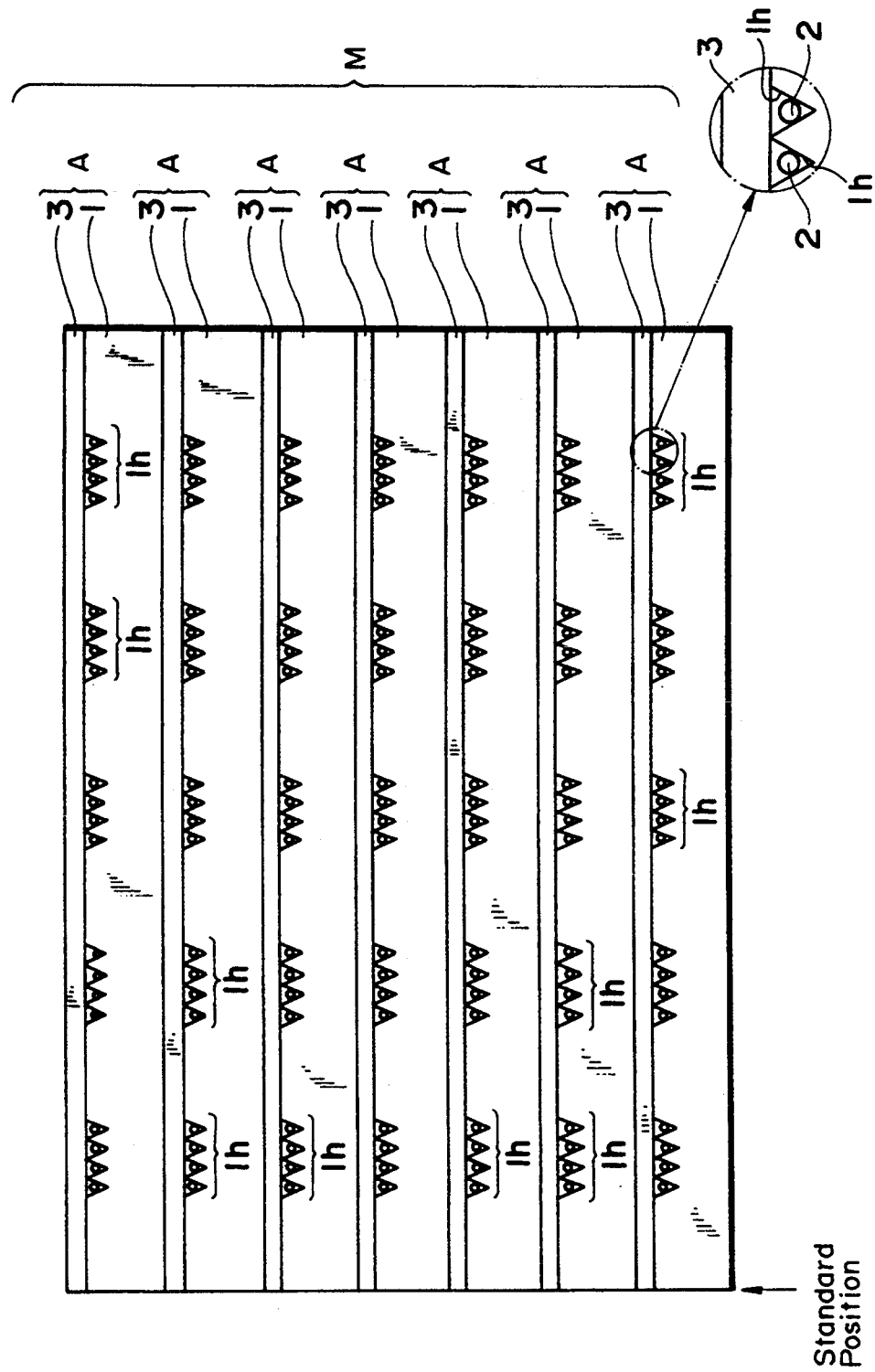
FIG. 6 is a front view, seen from the direction of the optical axis of the optical fibers, for showing the stationary matrix substrate of an optical switch utilizing optical fiber arranging members according to the third embodiment of the first aspect of the present invention.

Next, the optical fiber arranging member according to the third embodiment is explained with reference to FIG. 6. In each optical fiber arranging member used in this embodiment, fiber fix portions 1j each constituted by four V-grooves are formed at five locations. In this matrix substrate M, a cover plate 3 is fixed to the upper surface of an optical fiber arranging member to constitute a fiber array unit A, and fiber array units A each obtained in this manner are stacked in a direction perpendicular to the upper surfaces of the optical fiber arranging members, thereby constituting the matrix substrate M. Therefore, end faces 1e of the substrates 1 and the end portions of first V-grooves 1g are exposed in the front surface of the matrix substrate M.

The operation of connecting the optical fibers by using this matrix substrate M will be explained. In this embodiment, the optical fibers can be connected by using a convey means having the same mechanism as that of the first embodiment. In this case, second optical fibers (master optical fibers) 6 are moved to come close to corresponding second V-grooves 1h exposed from the substrate 1, and the end portions of the second optical fibers 6 are engaged with the second V-grooves 1h. A robot hand is driven to slide the second optical fibers 6 toward a slit S in the longitudinal direction of the second V-grooves 1h. The extending lines of the second V-grooves 1h coincide with the extending lines of the first V-grooves 1g, and first optical fibers 2 are fixed on the extending lines of the second V-grooves 1h. Therefore, the second optical fibers 6 are reliably connected to the optical fibers 2.

In this manner, according to the above-described embodiment, as the second optical fibers 6 are arranged without using a connector, high-density packaging is enabled. Conventionally, since the optical fibers are arranged in units of multi-core connectors, a large extra space is needed in integration. For example, guide pins or the like are used to couple each connector with a corresponding master connector, so that spaces for forming guide holes are needed, thereby hindering size reduction. In this embodiment, although guide pins are not used, alignment and coupling are performed in units of conventional connectors. Therefore, the function of the optical switch can be sufficiently obtained. In addition, because the optical fibers are arranged without using a connector, a method other than connector alignment/coupling, as in the conventional apparatus, can be employed.

Figure 7A:
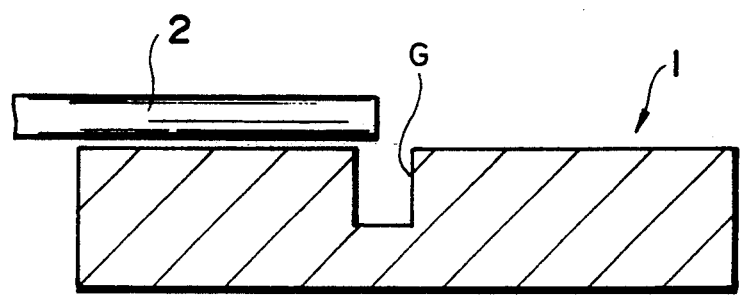
FIGS. 7A to 7C are views showing the steps in a method of manufacturing an optical fiber arranging member according to the fourth embodiment of the first aspect of the present invention.
Figure 7B:
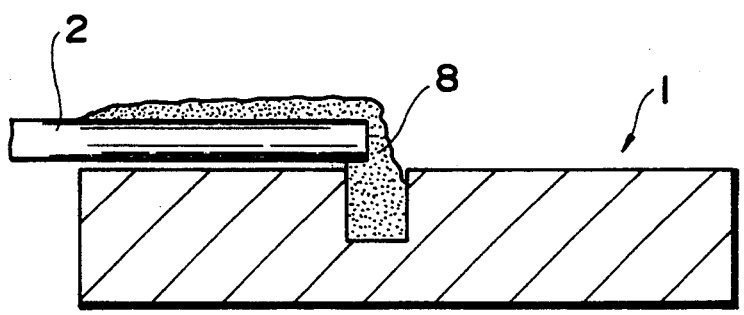
Figure 7C:
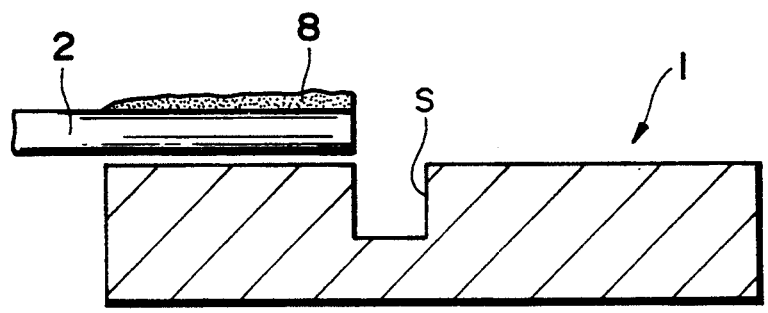

The method of manufacturing an optical fiber arranging member according to the fourth embodiment will be explained with reference to FIGS. 7A to 7C.

In this embodiment, a V-grooved substrate, in which a lower groove is formed in advance before forming a slit by a diamond blade, is used. More specifically, a substrate 1 formed with a lower groove G is prepared, and first optical fibers 2 are inserted in the V-grooves (FIG. 7A). An adhesive 8 is applied to the first optical fibers 2. In this case, since excessive adhesive 8 flows into the lower groove G, the flow area of the adhesive 8 on the substrate 1 can be limited (FIG. 7B). Thereafter, by using a diamond blade having a width slightly larger than the lower groove G, the end faces of the first optical fibers 2 are cut along the lower groove G, thereby forming a slit S (FIG. 7C). The manufacturing method according to this embodiment is effective when the first optical fibers 2 are to be fixed by adhesion by using an adhesive having a particularly low viscosity, because the flow area of the adhesive 8 can be decreased. This method is also effective when the positions of the first optical fibers 2 are to be fixed, because alignment of the distal ends of the first optical fibers 2 is facilitated.

Next, a method of manufacturing an optical fiber arranging member according to the fifth embodiment of the present invention will be described with reference to FIGS. 8 and 9.

First of all, one Si substrate 1 is prepared. By using a diamond cutter having a sharp point, four first V-grooves (fiber fixing grooves) 1g are formed at the same pitch interval to form a fiber fix portion 1j. The depth of the first V-grooves 1g is determined by considering the outer diameter of first optical fibers 2.

Other first guide grooves 9 to be engaged with guide pins 10 are formed on the both sides of the set of the four first V-grooves 1g. As the outer diameter of the guide pins 10 is larger than that of the first optical fibers 2, the depth of the guide grooves 9 is set large to increase the entire shape of the first guide grooves 9.

Thereafter, this one substrate is cut along a direction perpendicular to the first V-grooves 1g and the first guide grooves 9, thereby dividing this one substrate 1 into two half substrates. The first V-grooves 1g and the first guide grooves 9 of a substrate 1A, and second V-grooves 1h and second guide grooves 9a of a substrate 1B, respectively, completely correspond to each other because these grooves are originally formed in one substrate 1.

Figure 8:
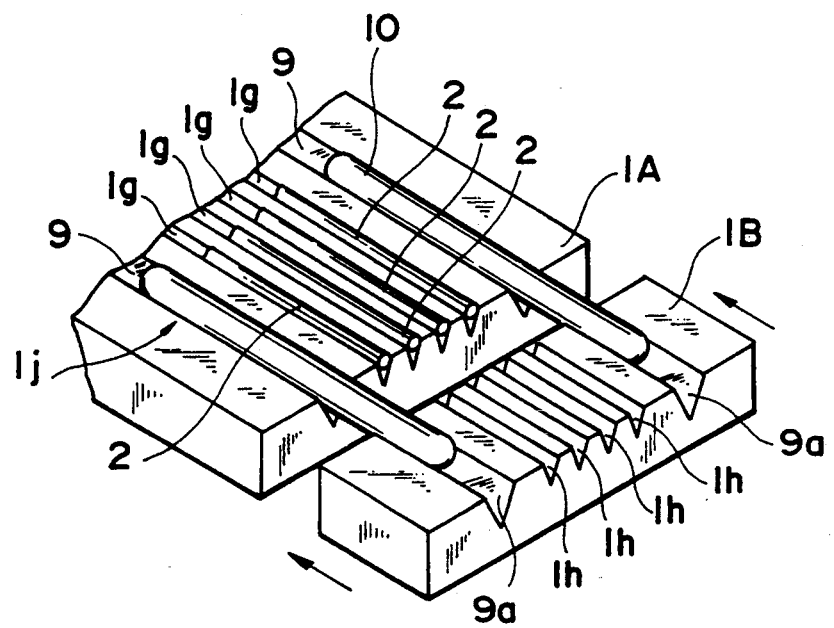
FIG. 8 is a perspective view showing a method of manufacturing an optical fiber arranging member according to the fifth embodiment of the first aspect of the present invention.
Figure 9:
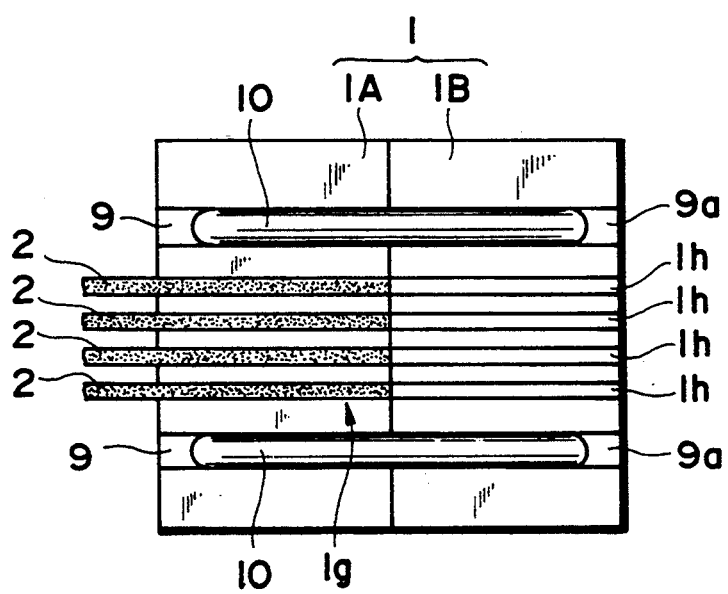
FIG. 9 is a plan view, seen from a direction perpendicular to the upper surface of a substrate, for showing the optical fiber arranging member according to the fifth embodiment of the first aspect of the present invention.

The first optical fibers 2 are fixed to one substrate 1A with the adhesive, and the guide pins 10 are engaged with the first and second guide grooves 9 and 9a of the two substrates 1A and 1B (shown in FIG. 8). As described above, since the first V-grooves 1g and the first guide grooves 9, and the second V-grooves 1h and the second guide grooves 9a of the respective substrates completely correspond to each other, if the first guide grooves 9 and the second guide grooves 9a are set to coincide with each other by the guide pins 10, the first and second V-grooves 1g and 1h necessarily coincide (see FIG. 9).

In this embodiment, one substrate is divided, and then the first optical fibers 2 are fixed. However, before the substrate is divided, the first optical fibers 2 may be fixed to half portions of the first V-grooves 1g, and the substrate may be divided by cutting together with the end portions of all the fixed optical fibers. In this case, the adhesive attaching to the end portions of the optical fibers can be removed, and the non-uniform end faces of the optical fibers can be corrected.

The number of fiber fix portions 1j can be two or more. For example, fiber fix portions 1j each constituted by four first V-grooves 1g may be arranged in the same direction, and four optical fibers supplied from one 4-core taped optical fiber core may be fixed to each fiber fix portion 1j.

Figure 10:
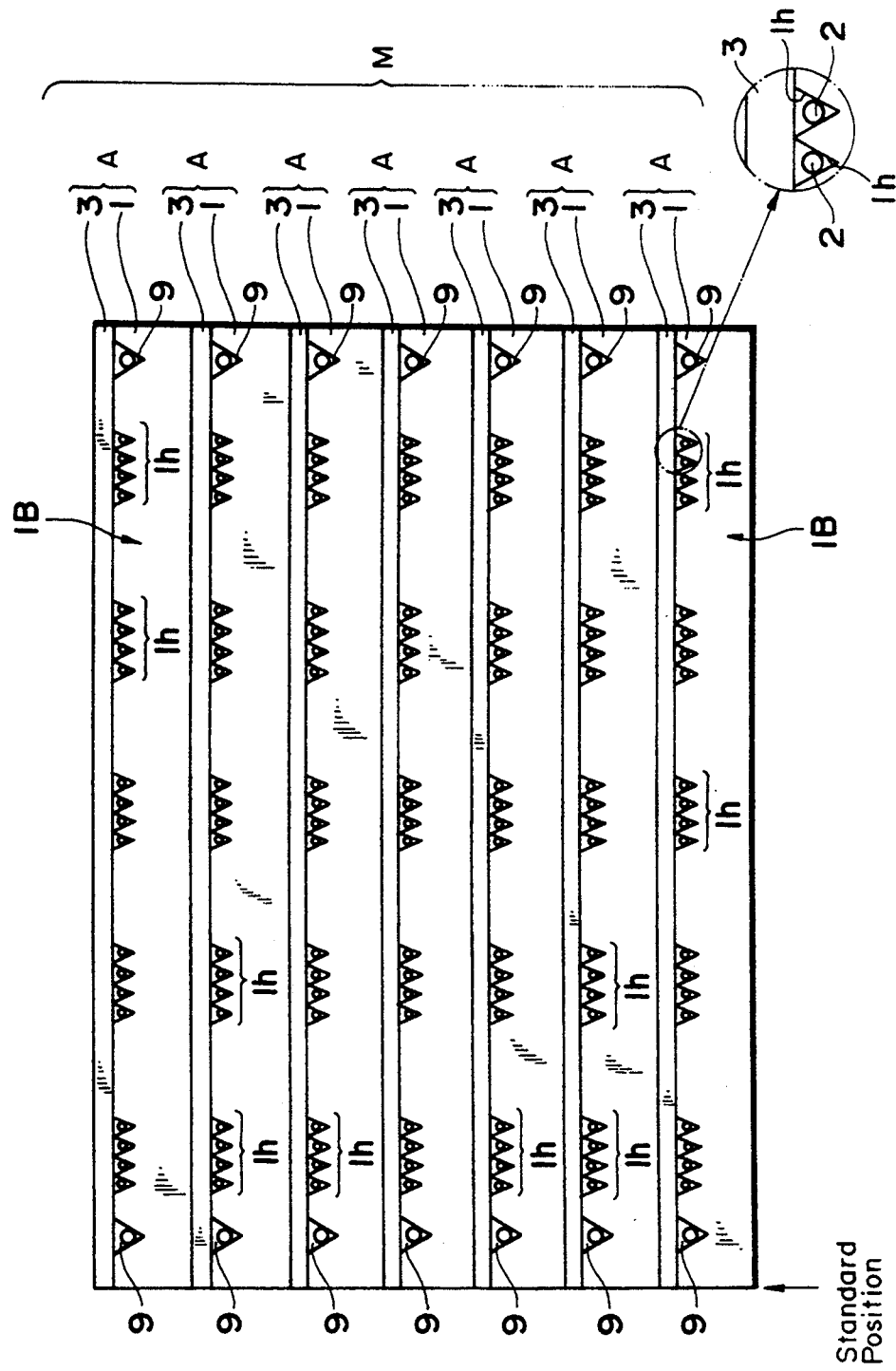
FIG. 10 is a front view, seen from the direction of the optical axis of the optical fibers, for showing the stationary matrix substrate of an optical switch utilizing optical fiber arranging members according to the sixth embodiment of the first aspect of the present invention.

Next, the optical fiber arranging member utilizing a stationary matrix board according to the sixth embodiment of the present invention will be explained with reference to FIG. 10.

In each optical fiber arranging member used in this embodiment, fiber fix portions 1j each constituted by four V-grooves 1g are formed at five locations, and first guide grooves 9 are formed on the two sides of the set of the fiber fix portions. In this matrix board M, a cover plate 3 is fixed to the upper surface of an optical fiber arranging member to constitute a fiber array unit A, and fiber array units A each obtained in this manner are stacked in a direction perpendicular to the upper surfaces of the optical fiber arranging members, thereby constituting the matrix board M. Therefore, end faces of substrates 1B are exposed in the front surface of the matrix board M.

The operation of connecting the optical fibers by using this matrix board M will be described with reference to FIGS. 8 to 10. In this embodiment, the optical fibers can be connected by using a convey means which is the same as the convey mechanism of the first embodiment. In this case, second optical fibers (master optical fibers) 6 are moved to come close to corresponding second V-grooves 1h exposed from the substrate 1B, and the end portions of the second optical fibers 6 are engaged in the second V-grooves 1h. A robot hand is driven to slide the master optical fibers toward a substrate 1A bonded to the substrate 1B in the longitudinal direction of the second V-grooves 1h. Since the substrates 1A and 1B are positioned at high precision, the second optical fibers are reliably connected to first optical fibers 2 fixed to the substrate 1A.

Next, the optical fiber arranging member according to the seventh embodiment will be explained with reference to FIG. 11.

In this embodiment, an optical fiber arranging member for fixing a plurality of first optical fibers is formed of a rectangular parallelepiped substrate 11 having a plurality of fiber fixing holes 11g. In this embodiment, first optical fibers (not shown) are inserted in the fiber fixing holes 11g from one end (the right end in FIG. 11) of the substrate 11, and the end faces of the fibers are exposed at an end face 11e of the substrate 11. A substrate having fiber introduction grooves for guiding second optical fibers is disposed ahead (the left side in FIG. 11) of the end face 11e of the substrate 11.

In order to form the optical fiber arranging member described above, small-diameter molding pins for forming the fiber fixing holes 11g are arranged in the cavity of a plastic molding die (not shown). The outer diameter of the small-diameter molding pins is set to 0.125 mm to almost match the outer diameter of the optical fibers.

An epoxy resin material is filled in the molding cavity and hardened. Then, the small-diameter molding pins are removed to obtain a fiber arranging member 12 having the plurality of fiber fixing holes 11g. Thereafter, the first optical fibers (not shown) may be inserted in the fiber fixing holes 11g and fixed.

The optical fiber arranging member 12 according this embodiment can directly employ the manufacturing technique of a multi-core optical connector used for engaging a plurality of optical fibers at once. For example, this fiber arranging member 12 can be manufactured by transfer molding by using a thermosetting epoxy resin.

Figure 12:
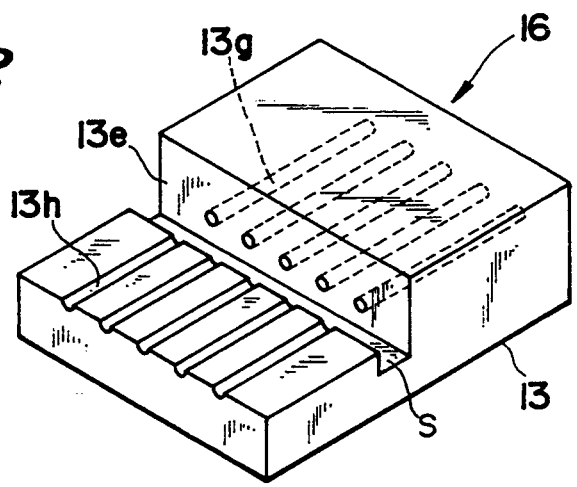
FIG. 12 is a perspective view of an optical fiber arranging member according to the eighth embodiment of the first aspect of the present invention.
Figure 13:
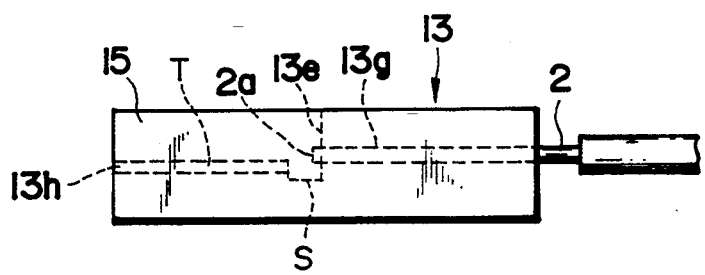
FIG. 13 is a view for explaining a manufacturing step of the optical fiber arranging member of FIG. 12.

The optical fiber arranging member according to the eighth embodiment will be explained with reference to FIGS. 12 and 13.

Figure 11:
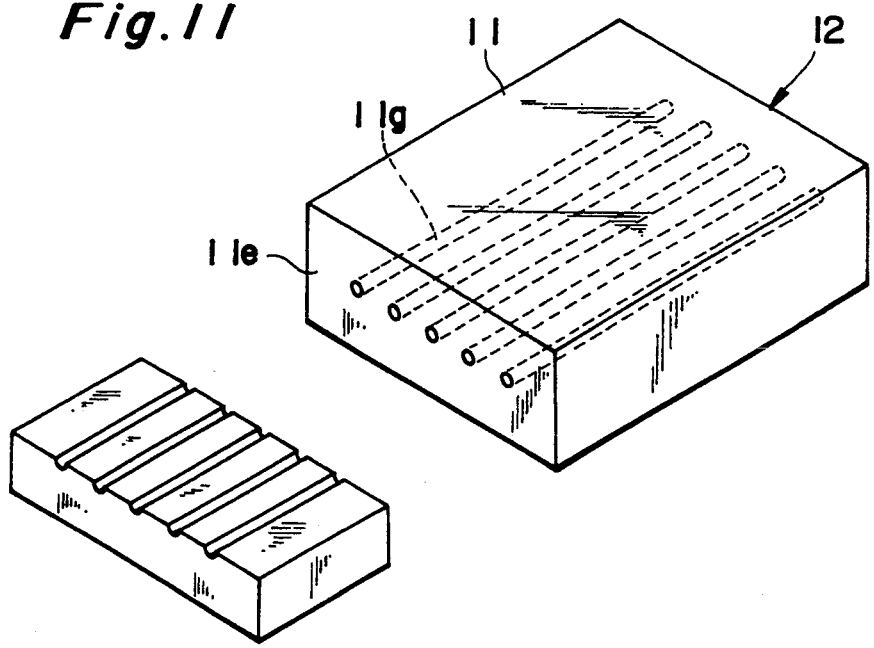
FIG. 11 is a perspective view of an optical fiber arranging member according to the seventh embodiment of the first aspect of the present invention.

An optical fiber arranging member according to this embodiment is formed by cutting a substrate 13 (schematically shown in FIG. 13) having the same structure as the substrate 11 shown in FIG. 11. More specifically, in this embodiment, the substrate 13 having the same structure as the substrate 11 of FIG. 11 having the fiber fixing holes 11g is formed. This substrate 13 is subjected to cutting to remove a portion 15 surrounded by a broken line T in FIG. 13, thereby forming an optical fiber arranging member 16 shown in FIG. 12.

When cutting of the substrate 13 is to be performed, the substrate 13 is first cut into an L-letter shape to remove the upper left half of the substrate 13 from the intermediate portion thereof. Then, semicircular fiber introduction grooves 13h are formed in the left side of the intermediate portion of the substrate 13. As fiber fixing holes 13g exist on the right side of the intermediate portion of the substrate 13, first optical fibers 2 are inserted in these fiber fixing holes 13g and fixed with an adhesive. In this case, it is preferable to set end portions 2a of the first optical fibers 2 to slightly project from an end face 13e of the substrate 13.

Subsequently, corner portions where the end portions of the fiber fixing holes 13g and the semicircular fiber introduction grooves 13h are connected are cut along a direction perpendicular to the longitudinal direction of the fiber introduction grooves 13h, thereby forming a slit S. When the slit S is formed, the end portions 2a of the first optical fibers 2 projecting from the fiber fixing holes 13g are set flush, and an excessive adhesive attaching to the end portions of the fiber fixing holes 13g is removed.

According to this embodiment, the optical fiber arranging member 16 in which the fiber introduction grooves 13h and the fiber fixing holes 13g are integrally formed is obtained in this manner.

The optical fiber arranging member according to the ninth embodiment will be explained with reference to FIGS. 14 to 16.

This embodiment exemplifies the structure of a fiber arranging member having a guide. In this embodiment, fiber fixing substrate 21A and fiber introduction substrate 21B are separate and are coupled through a guide means. The fiber fixing substrate 21A has a plurality of fiber fixing holes 21g and guide pin holes 24. The fiber introduction substrate 21B has a plurality of semicircular fiber introduction grooves 21h and guide pin grooves 24a in its upper surface.

Guide pins 26 are inserted in the guide pin grooves 24a and the guide pin holes 24 to couple the fiber fixing and introduction substrates 21A and 21B, and the fiber fixing holes 21g and the fiber introduction grooves 21h are coaxially positioned. First optical fibers 2 are inserted in the fiber fixing holes 21g, and second optical fibers (not shown) are guided, through the fiber introduction grooves 21h, to the first optical fibers 2 fixed to the fiber fixing holes 21g, thereby optically connecting the second optical fibers to the first optical fibers 2.

A process of forming this optical fiber arranging member will be described with reference to FIGS. 15 and 16.

Figure 15:
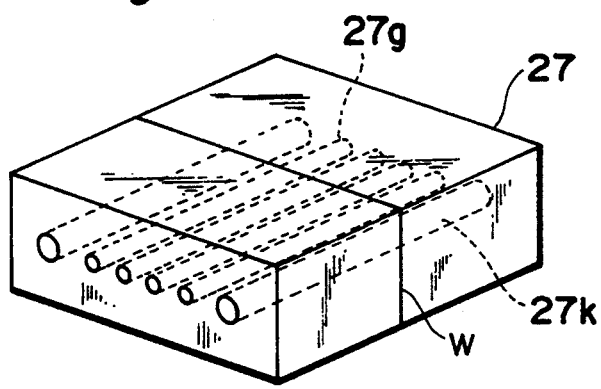
FIG. 15 is a perspective view showing the first manufacturing process of the optical fiber arranging member of FIG. 14.
Figure 16:
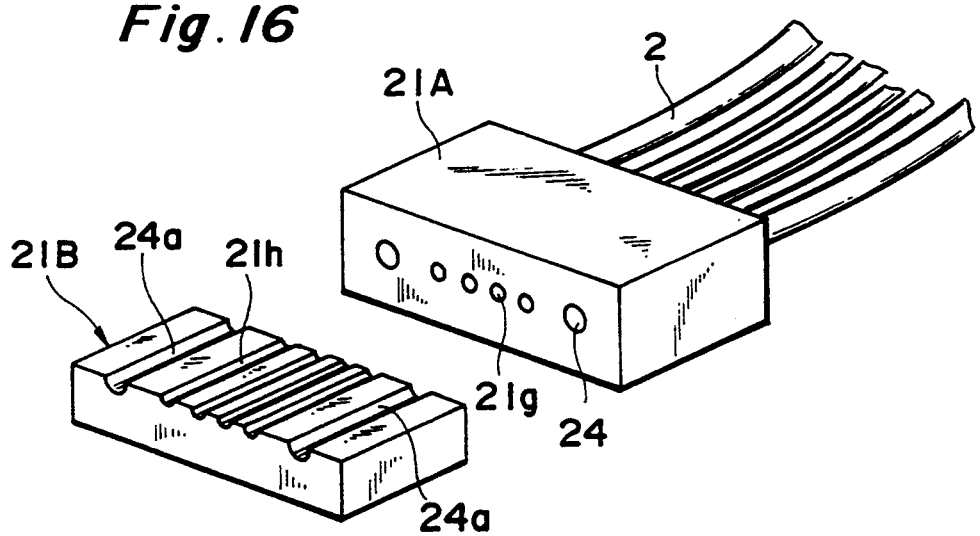
FIG. 16 is a perspective view showing the second manufacturing process of the optical fiber arranging member of FIG. 14.

As shown in FIG. 15, a rectangular parallelepiped substrate 27 having optical fiber insertion holes 27g and guide pin insertion holes 27k are formed by using a molding die. The substrate 27 is divided into right and left halves at a position indicated by a solid line (W) in FIG. 15. The upper half of one divided half of the substrate 27 is removed to form a fiber introduction substrate 21B having the plurality of fiber introduction grooves 21h having a semicircular section and guide pin grooves 24a. First optical fibers 2 are inserted in the fiber fixing holes 21g of the other divided half of the substrate 27 to form the fiber fixing substrate 21A.

Figure 14:
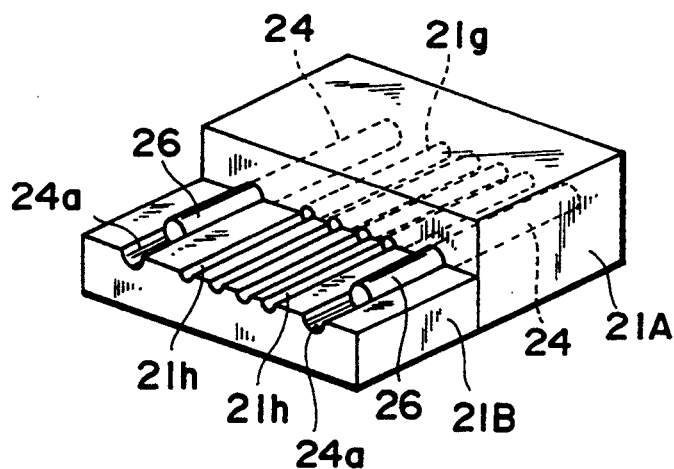
FIG. 14 is a perspective view for explaining an optical fiber arranging member according to the ninth embodiment of the first aspect of the present invention.

The fiber fixing and introduction substrates 21A and 21B formed in this manner are coupled to each other by using the guide pins 26, thereby manufacturing a fiber arranging member having a guide shown in FIG. 14.

Figure 17:
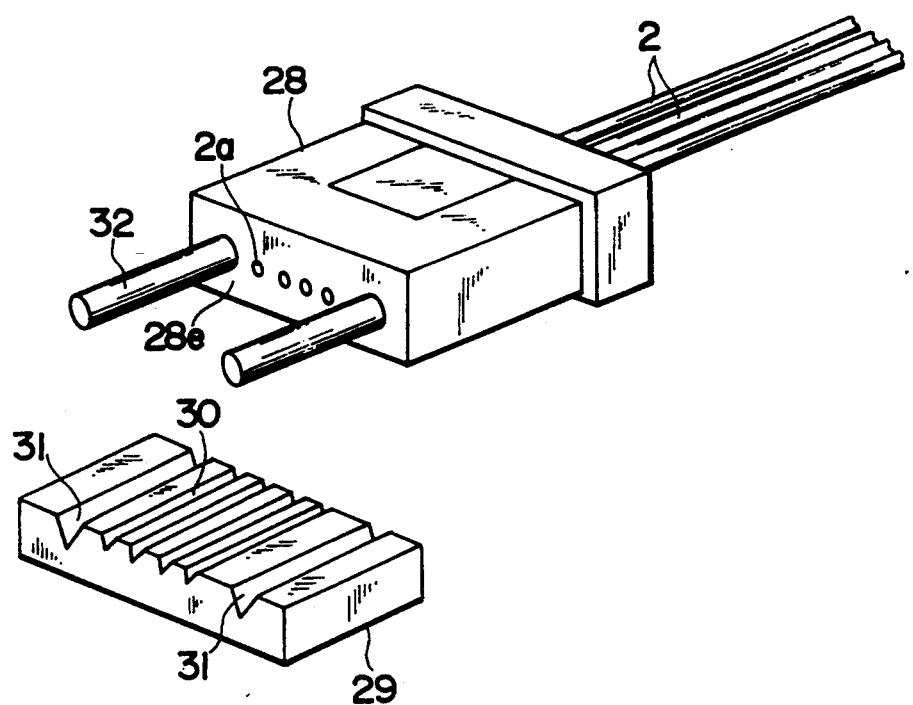
FIG. 17 is a perspective view of an optical fiber arranging member according to the tenth embodiment of the first aspect of the present invention.

The tenth embodiment will be described with reference to FIG. 17. This embodiment exemplifies a case wherein a known multi-core optical connector 28 is utilized as a fiber arranging member having a guide, and this multi-core optical connector 28 is coupled to a fiber introduction substrate 29 having fiber introduction V-grooves 30 and guide pin grooves 31 in its upper surface.

Generally, a multi-core optical connector 28 is positioned by guide pins and coupled to a corresponding multi-core optical connector (not shown). For this purpose, the multi-core optical connector 28 has first optical fibers 2, as shown in FIG. 17. End portions 2a of the fibers are exposed at an end face 28e of the connector, and the multi-core optical connector 28 has guide pins 32.

Therefore, when the guide pins 32 of the multi-core connector 28 are fitted and fixed in the guide pin grooves 31 of the fiber introduction substrate 29, a fiber arranging member having a guide can be obtained. In this embodiment, the optical fibers can be connected by using a convey means which is the same as the convey mechanism of the first embodiment.

The embodiments of the first aspect of the invention described above can be systematically classified as follows.

First, the above embodiments can be classified into embodiments in which the fixing portions and the introduction portions of an optical fiber arranging member are formed of V-grooves, and embodiments in which the fixing portions and the introduction portions of an optical fiber arranging member are formed of holes (round holes and semicircular grooves). Second, the above embodiments can be classified into embodiments of an integral type in which the optical fiber fixing portions and optical fiber introduction portions of an optical fiber arranging member are made of an integral member (substrate), and embodiments of a guide type in which the optical fiber fixing portions and optical fiber introduction portions are separately formed and coupled by guide pins. These differences will be described.

The difference between grooves and holes (round holes and semicircular grooves) for fixing and introducing optical fibers will be described. Regarding the function of fixing and introducing (guiding) optical fibers, there is no difference in superiority between the grooves and holes. The grooves are formed by, e.g., V-groove cutting or photoetching of an Si substrate, as described in the first embodiment. The holes are formed by, e.g., epoxy resin molding, as described in the seventh embodiment. Formation of the grooves can provide straightness more easily regardless of the length of the grooves. Accordingly, for example, when fiber fixing means and fiber introduction grooves are to be integrally formed, grooves can be formed more easily than holes.

The difference between an integral type optical fiber arranging member, in which fiber fixing means and fiber introduction grooves are integrally formed, and a guide type optical fiber arranging member, in which fiber fixing means and fiber introduction grooves are coupled to each other by guide pins, will be described.

In an integral type optical fiber arranging member in which the fiber fixing means and the fiber introduction grooves are integrally formed, when a large number of integral type optical fiber arranging members of this type are stacked to fix a plurality of fibers, the positional precision among the fiber fixing means need not be considered. This is due to the following reason. Fiber introduction grooves of the same shape are always formed to be coaxial with the end faces of optical fibers ahead of the positions of the end faces of optical fibers fixed to the respective fiber fixing means. Therefore, in an optical switch in which other optical fibers are conveyed to the fiber introduction grooves, high-precision fiber connection is guaranteed.

In a guide type optical fiber arranging member in which the fiber fixing means and the fiber introduction grooves are coupled to each other by the guide pins, some factors, e.g., a positional error in engagement of the guide pins, that change the precision exist. However, after fibers are fixed by adhesion to the fiber fixing means, the end faces of the fibers can be easily formed with an ordinary grinding means. Therefore, a high-precision surface roughness of the end faces of the fibers can be obtained comparatively easily than by cutting with a blade.

Figure 18:
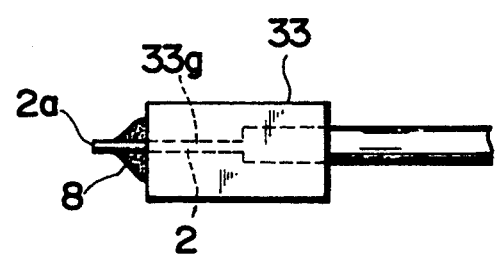
FIG. 18 is a side view of a guide pin engagement type optical fiber fixing substrate.
Figure 19:
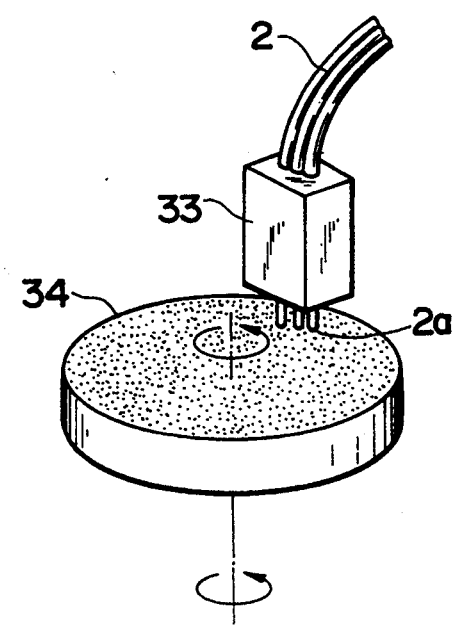
FIG. 19 is a perspective view of the optical fiber fixing substrate of FIG. 18 in a state wherein the end faces of optical fibers are being ground.

This will be described with reference to the accompanying drawings. In a guide type optical fiber arranging member, as shown in FIGS. 18 and 19, first optical fibers 2 can be inserted in fiber fixing holes 33g of a fiber fixing substrate 33, and end portions 2a of the optical fibers 2 fixed with an adhesive 8 can be ground with a lap grinder 34.

Figure 20:
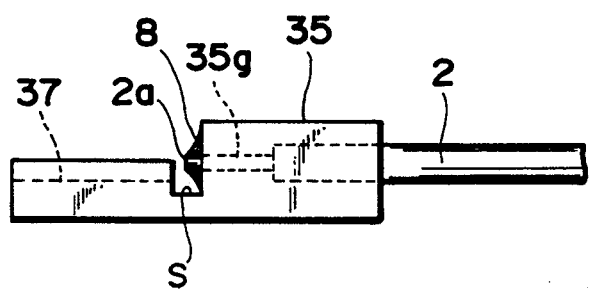
FIG. 20 is a side view of an integral type optical fiber arranging member in which optical fiber fixing means and optical fiber introduction grooves are integrally formed.
Figure 21:
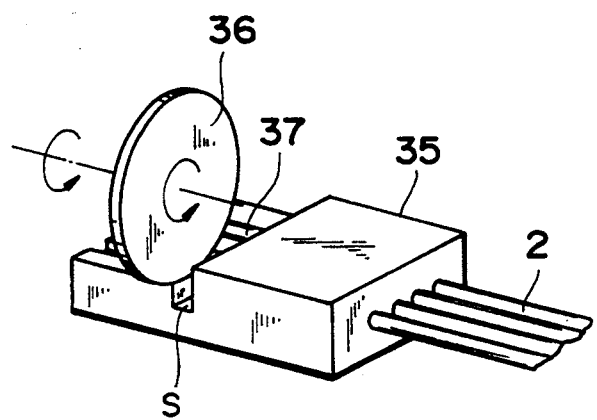
FIG. 21 is a perspective view of the optical fiber arranging member of FIG. 20 in a state wherein the end faces of the optical fibers are being ground.

By contrast, in an integral type optical fiber arranging member, as shown in FIGS. 20 and 21, when a slit S is to be formed in a substrate 35 having fiber introduction grooves 37 and fiber fixing holes 35g, end portions 2a of optical fibers 2 projecting from the fiber fixing holes 35g are cut with the side surface of a thin rotary blade 36.

The embodiments of the first aspect of the invention have been described. The present invention is not limited to the embodiments described above, but various changes and modifications can be made. Regardless of an optical fiber arranging member of an integral type or a guide pin coupling type, it is important to provide a fixing means for the first optical fibers and a fiber introduction means having introduction grooves for guiding second optical fibers to the end portions of the first optical fibers. Therefore, the fibers may be fixed or introduced either by grooves or holes (or semicircular grooves). The fiber fixing means and the fiber introduction grooves may be integrally formed, or may be separately formed and coupled to each other by using a guide means.

Furthermore, the optical fibers are not limited to single-core fibers but may also be optical fibers supplied from a multi-core fiber (e.g., a taped optical fiber core).

As has been described above, according to the present invention, individual optical fibers can be arranged at a high density and high precision, and second optical fibers can be accurately moved with a simple operation and optically connected to first optical fibers at high precision.

Next, the second aspect of the invention will be described with reference to FIGS. 22 to 26.

Figure 22:
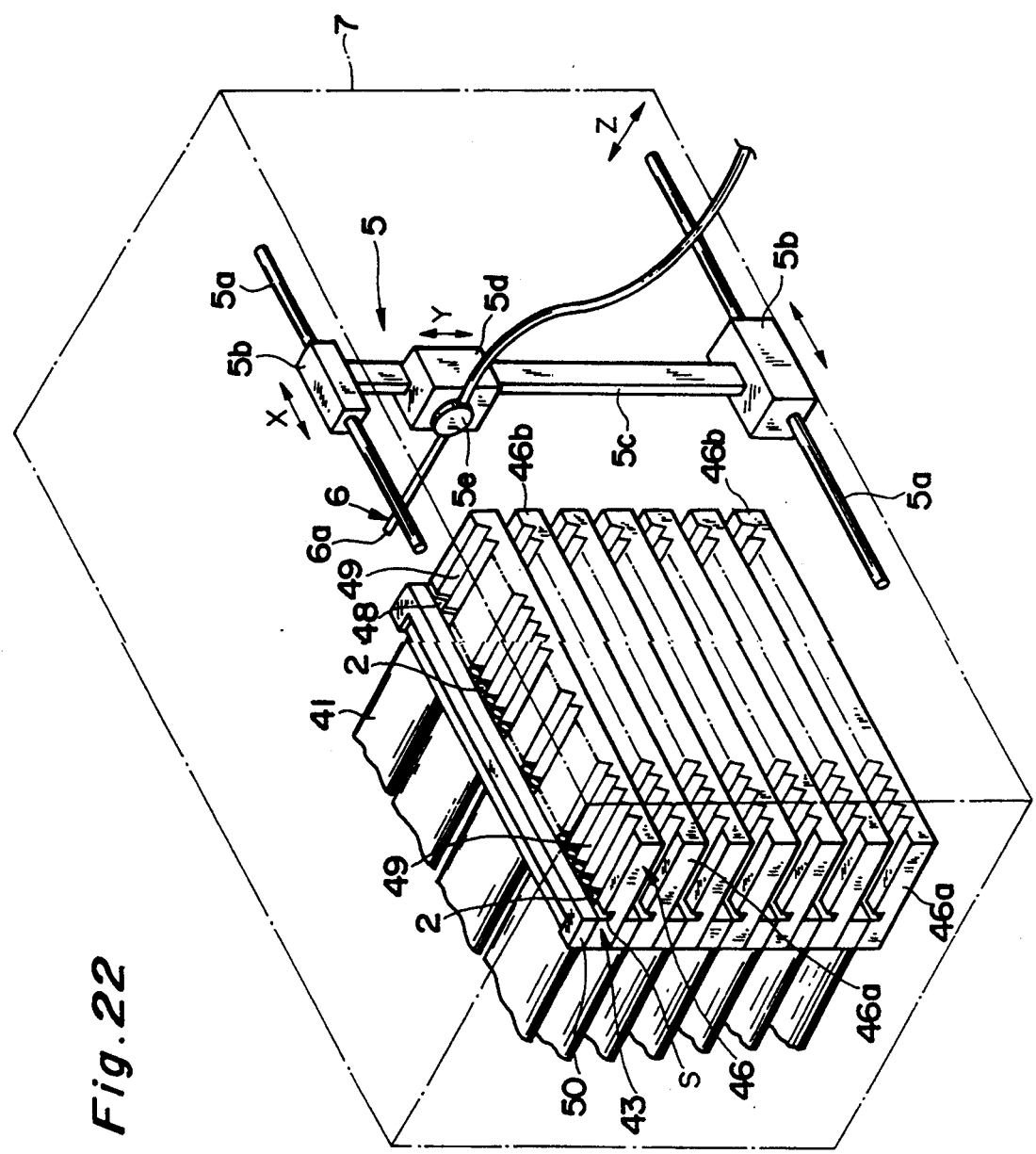
FIG. 22 is a perspective view showing an optical switch according to the eleventh embodiment of the second aspect of the present invention.

First, the optical switch according to the eleventh embodiment will be explained with reference to FIGS. 22 to 24. As shown in FIG. 22, the optical switch of this embodiment comprises optical fiber arranging members (optical fiber units) 43 each for a plurality of first optical fibers (n optical fibers) 2 extending from the end portion of a ribbon fiber 41, and a conveying means 5 for a second optical fiber (master optical fiber) 6.

Each optical fiber arranging member 43 comprises a substrate 46, a slit S formed in the upper surface of the substrate 46, first and second fiber fixing grooves 48 and 49 extending in a direction perpendicular to the longitudinal direction of the slit S to sandwich the slit S, the first optical fibers 2 fitted in the first fiber fixing grooves 48, and a cover plate 50 for pressing the first optical fibers 2 from above. In FIG. 22, seven optical fiber arranging members 43 are stacked. However, a plurality (e.g., 12) of optical fiber arranging members 43 can be stacked.

The substrate 46 is rectangular when seen from the upper portion of FIG. 22, and the slit S extends from one side surface 46a to the other side surface 46b of the substrate 46. The section of the slit S has a substantially recessed shape. A large number (e.g., 80) of first and second fiber fixing grooves 48 and 49 are arranged parallel to each other at a predetermined pitch interval (e.g., 0.25 mm) from one side surface (reference end face) 46a described above. Since the plurality of stacked substrates 1 are made of an Si material to have the same shape and size, the distances between side surface 46a and the respective fiber fixing grooves are the same throughout all the substrates 46.

In this embodiment, the first and second fiber fixing grooves 48 and 49 are V-grooves, and the extending lines of the respective fiber fixing grooves in the longitudinal direction thereof coincide. The first optical fibers 2 extending from the ribbon fiber 41 are inserted in the first fiber fixing grooves 48 from the rear portions of the fix grooves, and the distal end faces of the fibers form the same plane as one vertical wall of the slit S. As described above, the slit S has a substantially recessed shape, and the depth thereof is slightly larger than that of the V-grooved fiber fixing grooves.

The first optical fibers 2 contact the side walls of the bottom portions of the V-grooves, and are held in this state by an adhesive. The cover plate 50 made of silicon is bonded to the upper surface of the substrate 46 to protect the first optical fibers 2 fixed in the first fiber fixing grooves 48. As the cover plate 50 is bonded to the substrate 1 such that the distal end faces of the first optical fibers 2 are exposed, no problems arise in connection of the first optical fibers 2 to the second optical fiber 6. The first optical fibers 2 are fixed on the bottom portions of the V-grooves having a size to sufficiently bury them, so that the cover plate 50 is bonded to the upper surface of the substrate 46 in a state close to surface contact. Hence, all the optical fiber arranging members 43 that are stacked in the plurality of stages have the same arranging state. For example, the distance between one side surface (reference end face) 46a of the substrate 46 and a 10th first optical fiber 2 thereof counted from one side surface 46a is the same in any optical fiber arranging member 43.

In this embodiment, as the plurality of optical fiber arranging members 43 are stacked to have their side surfaces 46a flush, as described above, the distance between one side surface 46a and an arbitrary first optical fiber 2 from the side surface 46a of a given optical fiber arranging member is equal to that of any other optical fiber arranging member. The upper surface of the substrate 46 is cut from one side surface 46a to the other surface 46b thereof with a diamond cutter or the like to form the slit S. A plurality of V-grooves are formed with a diamond cutter or the like in a direction perpendicular to the longitudinal direction of the slit S, thereby forming the first and second fiber fixing grooves 48 and 49. The substrate is then cut at appropriate positions, thereby easily manufacturing the substrates 46 shown in FIG. 22. The substrates 46 can also be manufactured at high precision by a photoetching technique (not shown).

The second fiber fixing grooves 49 serve as the introduction grooves of the second optical fiber 6. As shown in FIG. 22, the conveying means 5 for conveying the second optical fiber 6 to the corresponding one of the second fiber fixing grooves 49 is arranged ahead of the optical fiber arranging member 43.

The conveying means 5 has two upper and lower linear guide rails 5a arranged along the direction of an arrow X in FIG. 22, two linearly movable members 5b movable in the X direction along the linear guide rails 5a, a linear guide rail 5c held by the upper and lower linearly movable members 5b, and a linearly movable member 5d movable in the Y direction along the linear guide rail 5c.

A rotary disk 5e for supporting the second optical fiber 6 is provided to the linearly movable member 5d. The distal end portion of the second optical fiber 6 can be rotated along the Y-Z plane by the rotary disk 5e. The linearly movable members 5b and 5d are moved by power transmission mechanisms (not shown) including ball screws or the like. Therefore, the second optical fiber 6 can be conveyed to an arbitrary second fiber fixing groove 49.

The above optical switch is housed in a rectangular housing member 7. The housing member 7 is filled with a matching oil, or anti-reflection films are deposited on the coupling end faces of the first and second optical fibers 2 and 6, so that the optical characteristics (e.g., a switching loss and a reflection loss) between the optical fibers in the switching operation are stabilized.

The optical coupling portion between the first and second optical fibers 2 and 6 of this optical switch will be described in detail with reference to FIGS. 23 and 24.

Figure 23:
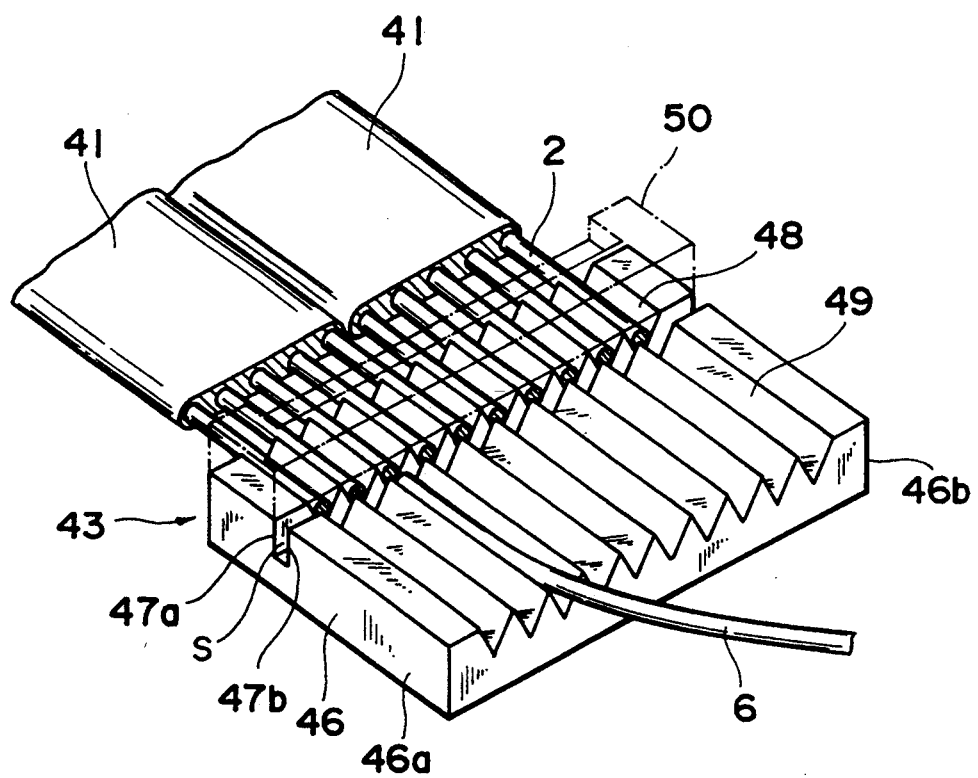
FIG. 23 is a perspective view showing the main part of the optical switch of the embodiment of FIG. 22.
Figure 24:
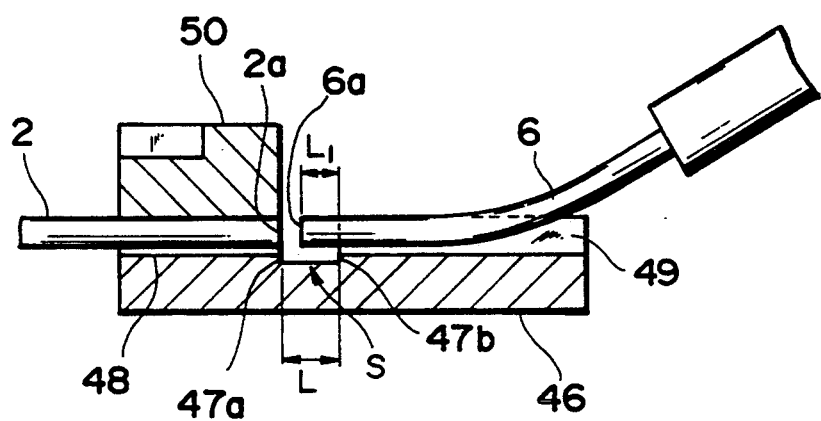
FIG. 24 is a side sectional view of a fiber fixing groove shown in FIG. 23.

FIGS. 23 and 24 show the positional relationship among the slit S formed in the upper surface of each substrate 46, the V-grooved first and second fiber fixing grooves 48 and 49, and the first and second optical fibers 2 and 6. As shown in FIG. 24, a distal end face 6a of the second optical fiber 6 is located in the slit S and is not in contact with a distal end face 2a of the first optical fiber 2. In this state, the first and second optical fibers 2 and 6 are optically coupled to each other, so that optical transmission can be performed from one to the other.

As the slit S is provided, the connecting loss in the distal end faces 2a and 6a of the first and second optical fibers 2 and 6, respectively, can be minimized. This is due to the following reason. If the slit S does not exist, when dust is deposited in the V-grooved first and second fiber fixing grooves 48 and 49, the dust can escape only in the longitudinal direction of the V-grooves. In this case, when the second optical fiber 6 is moved in the V-groove in response to every switching operation to perform optical coupling, an axial displacement occurs in the distal end faces 2a and 6a of the first and second optical fibers 2 and 6, respectively, thereby increasing the connecting loss.

In this embodiment, the slit S extends in a direction perpendicular to the first and second fiber fixing grooves 48 and 49, and the distal end faces 2a of the first optical fibers 2 are set to form the same plane as one vertical wall 47a of the slit S. Therefore, dust that comes flying close to the distal end faces 2a can easily escape to the outside of the substrate 46 through the slit S, so that an increase in connecting loss at the optical coupling portion at the distal end of each optical fiber can be suppressed. In particular, in this embodiment, the bottom of the slit S is formed to be deeper than the groove bottoms of the first and second fiber fixing grooves 48 and 49, and the distal end faces 2a and 6a of the first and second optical fibers 2 and 6, respectively, are located in this slit S and are optically coupled to each other at positions above the bottom of the slit S. Therefore, even if dust is deposited on the bottom of the slit S, it will not interfere with optical coupling.

In FIG. 24, a relationship L: $L_1 = 5:4$ is indicated. In this embodiment, the distal end face 6a of the second optical fiber 6 is smoothly cut and not subjected to any special treatment.

Figure 25:
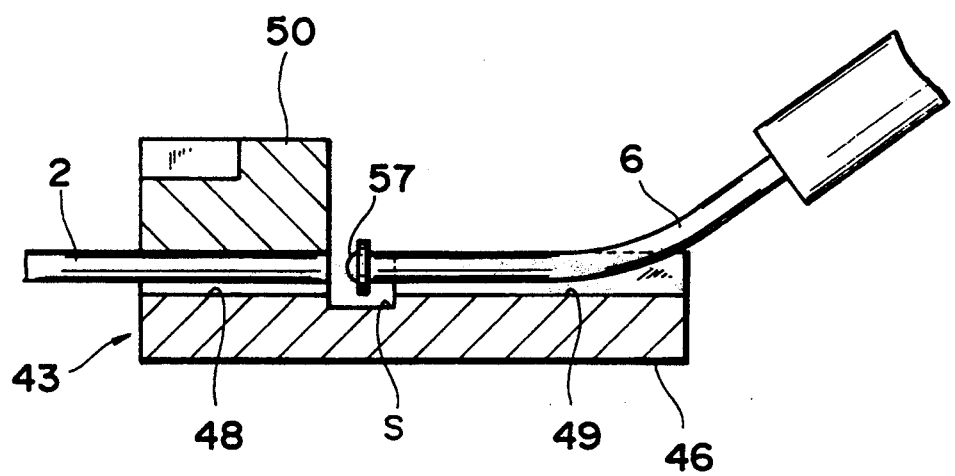
FIG. 25 is a side sectional view showing the distal end portion of a second optical fiber in a fiber fixing groove according to the twelfth embodiment of the second aspect of the present invention.

FIG. 25 shows the twelfth embodiment of the invention, wherein a condenser lens 57 is provided on the distal end of a second optical fiber 6. Except for this, the arrangement of the second embodiment is the same as that of the first embodiment. According to the second embodiment, light emerging from the second optical fiber 6 can be condensed on a distal end face 2a of a first optical fiber 2 by the condenser lens 57. Therefore, according to the second embodiment, even if some axial displacement is present between the first and second optical fibers 2 and 6, a connecting loss at the optical coupling portion can be suppressed.

Figure 26:
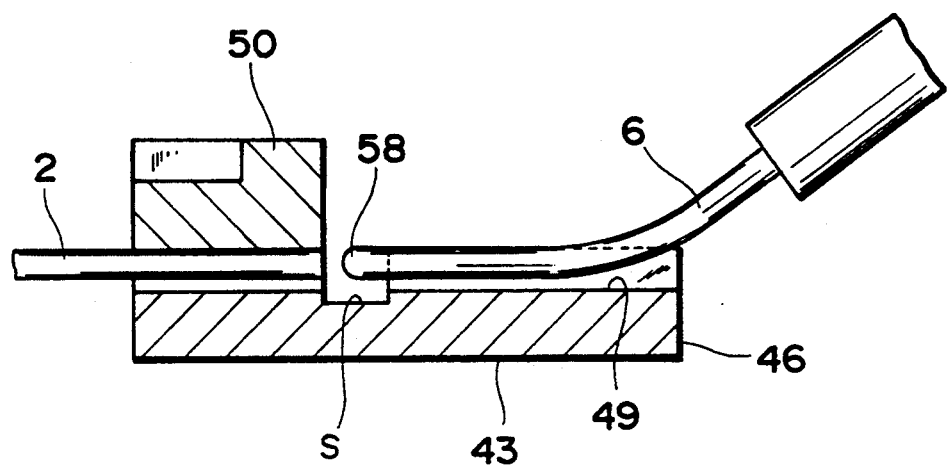
FIG. 26 is a side sectional view showing a fiber fixing groove and the distal end portion of a second optical fiber according to the thirteenth embodiment of the second aspect of the present invention.

FIG. 26 shows the thirteenth embodiment of the present invention, wherein a spherical portion 58 is formed on the distal end face of a second optical fiber 6 by heat fusion. The spherical portion 58 performs a condenser function like the condenser lens 57 of the second embodiment. At the same time, any breakage, flaw, or the like caused on the fiber end faces are corrected by heat fusion. More specifically, the end face edge of an optical fiber is sometimes damaged and broken when the optical fiber is being cut with a grinder or the like. In this case, the breakage causes connecting loss due to light scattering. Moreover, since the optical fiber is made of a brittle material, cracking can be caused in the end face of the fiber by the breakage or flaw. However, when the end face of the optical fiber is fused by heating, the damage on the end face edge is corrected to form a smooth surface, thereby eliminating the problem of an optical loss or cracking. In this manner, according to the connecting method of the thirteenth embodiment, optical connection between first optical fibers 2 and the second optical fiber 6 can be reliably performed, and because of the presence of a slit S, a connecting loss caused at the optical coupling portion by dust can be eliminated. When the optical fiber is fused by heating, the distal end of the optical fiber becomes round due to the surface tension of the fused fiber, and the distal end of the optical fiber becomes bigger than its original size. According to this embodiment, the optical axis of the optical fiber 6 in height is not affected since the distal end of the fiber 6 is arranged within the slit S. The optical coupling between the optical fiber 6 and the optical fiber 2 is precisely performed because of the presence of the slit S.

The function of the conveying means 5 will be described with reference to FIG. 22.

The distal end face 6a of the second optical fiber 6 is maintained at the horizontal state by the rotary disk 5e. In this state, the conveying means 5 is driven to move the distal end face 6a of the second optical fiber 6 to come close to a predetermined second fiber fixing groove 49. Thereafter, the distal end portion of the second optical fiber 6 is disposed above the second fiber fixing groove 49 corresponding to the first fiber fixing groove 48, in which the first optical fiber 2 to be connected to this second optical fiber 6 is fixed (FIG. 23). In this case, since the positional precision is moderated by the opening width of the V-groove of the second fiber fixing groove 49, alignment becomes easy. For example, when V-grooves are formed adjacent to each other at a pitch of 0.25 mm, the conveying means 5 may be driven such that the core center of the second optical fiber 6 is located within the opening width (0.25 mm) of the V-groove.

The rotary disk 5e is rotated counterclockwise in FIG. 22 to engage the distal end portion of the second optical fiber 6 in the second fiber fixing groove 49 (FIG. 24). At this time, as the second optical fiber 6 contacts the second fiber fixing groove 49 in an inclined state, reaction caused by the elastic deformation of the optical fiber acts on the distal end portion of the second optical fiber 6. As a result, the distal end portion of the second optical fiber 6 is bent along the groove, and the reaction described above serves as a bonding force of the V-groove and the second optical fiber 6.

Thereafter, the moving mechanism of the conveying means 5 is driven to move the second optical fiber 6 in the Z direction, thereby causing the distal end face 6a of the second optical fiber 6 to come close to the distal end face 2a of the first optical fiber 2 (in a non-contact manner). By this operation, the second optical fiber 6 can be optically coupled to an arbitrary first optical fiber 2.

In this manner, according to the optical switch of this embodiment, since positioning of the second optical fiber 6 can be roughly performed, positioning becomes easy. As a connector ferrule is not used, the optical fiber arranging members 43 become compact to decrease the entire size of the apparatus.

The second aspect of the present invention is not limited to the embodiments described above, and a mechanism from which the rotating mechanism including the rotary disk 5e and the like is omitted is also possible. For example, when the second optical fiber 6 is fixed in advance to be inclined downward and the linearly movable member 5d is moved in the Y direction of FIG. 22, a similar bent to that described above can be imparted to the second optical fiber 6. In this case, the other operations of the conveying means 5 can be the same as that described above.

In the above embodiments, the first and second fiber fixing grooves 48 and 49 are formed as V-grooves having the same sections. However, the first and second fiber fix grooves 48 and 49 need not form the same V-grooves.

It is important that the second fiber fixing grooves 49 have a mechanism for guiding the distal end portion of the second optical fiber 6 to a position to be optically coupled to the first optical fiber 2. Hence, the first and second optical fiber fixing grooves 48 and 49 may be V-grooves having the same angle of vertex but different heights of the grooves, or may be V-grooves having different angles of vertex. Each groove need not be a V-groove but can be part of an ellipse.

The first optical fibers 2 need not be optical fibers extending from the ribbon fiber 41 shown in FIG. 22 but can be optical fibers extending from an optical cable.

As has been described above, according to the second aspect of the invention, the individual optical fibers can be arranged at high precision with a simple arrangement, and the optical fibers can be reliably optically coupled to each other. In addition, when the optical fibers are to be optically coupled to each other in a non-contact manner, wear, damage, and the like on the distal end face of the fiber caused during the switching operation can be eliminated, thereby increasing the durability.

Since the optical fibers are fixed by utilizing the fiber fixing grooves formed in the same substrate, high-density, high-precision packaging is possible. Since the slit is formed at the connecting portion of the optical fibers, dust that comes flying to the connecting portion can be easily removed through this slit, so that connecting loss caused by the dust and the like can be decreased.

From the invention thus described, it will be obvious that the invention may be varied in many ways. Such variations are not to be regarded as a departure from the spirit and scope of the invention, and all such modifications as would be obvious to one skilled in the art are intended to be included within the scope of the following claims.

What is claimed is:

1. An optical switch for selectively coupling optical fibers, comprising:
    an optical fiber arranging member, including:
        a stationary fiber fixing portion for receiving and arranging a plurality of first optical fibers, each first optical fiber having an end portion, and
        a stationary fiber introduction portion having fiber introduction grooves therein for receiving at least one second optical fiber, said second optical fiber having a distal end portion,
    means for inserting longitudinally said second optical fiber to any selected fiber introduction groove and for conveying longitudinally said second optical fiber distal end along said fiber introduction groove to a selected first optical fiber to optically couple said second optical fiber with said selected first optical fiber.

2. An optical switch as recited in claim 1, wherein said fiber introduction grooves are arranged parallel to each other.

3. An optical switch as recited in claim 2, wherein said fiber fixing portion has a plurality of fiber fixing grooves therein, said fiber fixing grooves being arranged parallel to each other.

4. An optical switch as recited in claim 3, wherein said fiber arranging member further includes guide means for aligning and fixing said fiber introduction grooves in relation to said fiber fixing grooves.

5. An optical switch as recited in claim 3, wherein said fiber fixing grooves and said fiber introduction grooves are substantially V-shaped.

6. An optical switch as recited in claim 5, wherein said first optical fibers contact said fiber fixing portion along side surfaces of said V-shaped grooves.

7. An optical switch for selectively coupling optical fibers, comprising:
an optical fiber arranging member, including:
a fiber fixing portion for receiving and arranging a plurality of first Optical fibers, each first optical fiber having an end portion, and
a fiber introduction portion having fiber introduction grooves therein for receiving at least one second optical fiber, said second Optical fiber having a distal end portion, and
means for inserting longitudinally said second optical fiber to any selected fiber introduction groove for conveying longitudinally said second optical fiber distal end along said fiber introduction groove to a selected first optical fiber to optically couple said second optical fiber with said selected first optical fiber,
wherein said fiber introduction grooves are arranged parallel to each other;
wherein said fiber fixing portion has a plurality of fiber fixing grooves therein, said fiber fixing grooves being arranged parallel to each other;
wherein said fiber fixing grooves and said fiber introduction grooves are substantially V-shaped; and
wherein said fiber arranging member has a slit formed along a direction perpendicular to a longitudinal direction of said V-shaped grooves and positioned between said fiber fixing grooves and said fiber introduction grooves.

8. An optical switch for selectively coupling Optical fibers, comprising:
an optical fiber arranging member, including
a fiber fixing portion for receiving and arranging a plurality of first optical fibers, each first Optical fiber having an end portion, and
a fiber introduction portion having fiber introduction grooves therein for receiving at least one second optical fiber, said second optical fiber having a distal end portion,
means for inserting longitudinally said second optical fiber to any selected fiber introduction groove for conveying longitudinally said second optical fiber distal end along said fiber introduction groove to a selected first optical fiber to optically couple said second optical fiber with said selected first optical fiber,
wherein said fiber introduction grooves are arranged parallel to each other; and
wherein said fiber fixing portion has a plurality of fiber fixing holes therein, said fiber fixing holes being arranged parallel to each other.

9. An optical switch as recited in claim 8, wherein said fiber introduction portion and said fiber fixing portion are integral.

10. An optical switch as recited in claim 9, wherein said fiber arranging member has a slit therein along a direction perpendicular to the longitudinal direction of said fiber introduction grooves and between said fiber fixing holes and said fiber introduction grooves.

11. An optical switch as recited in claim 8, wherein said fiber arranging member further includes guide means for aligning and fixing said fiber introduction grooves in relation to said fiber fixing holes.

12. An optical fiber arranging member comprising:
a fiber fixing portion having holes therein for arranging a plurality of first optical fibers,
a fiber introduction portion having fiber introduction grooves, and
wherein said fiber arranging member hag a slit positioned between said fiber fixing holes and the fiber introduction grooves, and said fiber introduction portion and said fiber fixing portion are integral.

13. A method of manufacturing an optical switch having fiber fixing grooves and fiber introduction grooves to arrange a plurality of optical fibers, comprising the steps of:
forming a plurality of grooves parallel to each other in an upper surface of fiber arranging member;
fixing optical fibers to said fiber fixing grooves with an adhesive; and
cutting end portions of said optical fibers together with said fiber arranging member in a direction perpendicular to a longitudinal direction of said grooves, thereby forming said fiber arranging member having a slit which separates said fiber fixing grooves and said fiber introduction grooves.

14. A method of manufacturing an optical switch having fiber fixing holes and fiber introduction grooves to arrange a plurality of optical fibers, comprising the steps of:
forming a plurality of holes parallel to each other in a fiber arranging member;
forming fiber introduction grooves by exposing parts of said holes;
fixing optical fibers to nonexposed fixing holes with an adhesive; and
cutting end portions of said optical fibers together with said fiber arranging member in a direction perpendicular to a longitudinal direction of said holes, thereby forming said fiber arranging member having a slit which separates said nonexposed holes and said fiber introduction grooves.

15. An optical switch for selectively coupling optical fibers, comprising:
an optical fiber arranging member, including
a fiber fixing portion for receiving and arranging a plurality of first optical fibers, each first optical fiber having an end portion, and
a fiber introduction portion having fiber introduction grooves therein for receiving at least one second optical fiber, said second optical fiber having a distal end portion,
means for inserting longitudinally said second optical fiber to any selected fiber introduction groove for conveying longitudinally said second optical fiber distal end along said fiber introduction groove to a selected first optical fiber to optically couple said second optical fiber with said selected first optical fiber,
wherein said fiber introduction grooves are arranged parallel to each other;
wherein said fiber fixing portion has a plurality of fiber fixing grooves therein., said fiber fixing grooves being arranged parallel to each other; and wherein said fiber arranging member includes:
said fiber fixing portion and said fiber introduction portion which are separate;
said fiber fixing portion having first guide means for aligning and fixing said fiber introduction grooves and said fiber fixing grooves, said first guide means located on both sides of said plurality of fiber fixing grooves, and
said fiber introduction portion having second guide means for aligning and fixing said fiber introduction grooves and said fiber fixing grooves, said second guide means located on both sides of said fiber introduction grooves and positioned at corresponding positions to said first guide means,
wherein said optical switch further comprises guide pins to engage said first guide means and said second guide means, thereby aligning and fixing corresponding first and second guide means.

16. A method of manufacturing an optical switch having a fiber arranging member which includes a separate fiber fixing portion and fiber introduction portion for arranging a plurality of optical fibers, comprising the steps of:
forming a plurality of first grooves parallel to each other in an upper surface of said fiber arranging member;
forming at least one second groove on both sides of said first grooves;
cutting said fiber arranging member in a direction perpendicular to a longitudinal direction of said first grooves, thereby dividing said fiber arranging member into said separate fiber fixing portion and fiber introduction portion; and
engaging guide pins in said corresponding second groove thereby fixing said fiber fixing portion and said fiber introduction portion such that said corresponding first grooves align.

17. A method of manufacturing an optical switch having a fiber arranging member which includes a separate fiber fixing portion and fiber introduction portion for arranging a plurality of optical fibers, comprising the steps of:
forming a plurality of first holes parallel to each other in said fiber arranging member;
forming at least one second hole on both sides of said first holes;
cutting said fiber arranging member in a direction perpendicular to a longitudinal direction of said first holes, thereby dividing said fiber arranging member into said separate fiber fixing portion and fiber introduction portion;
forming fiber introduction grooves in said fiber introduction portion by exposing at least parts of said first holes of said fiber introduction portion;
forming guide grooves in said fiber introduction portion by exposing at least parts of said second holes of said fiber introduction portion; and
engaging guide pins in corresponding guide grooves and second holes of said fiber introduction portion and fiber fixing portion, respectively, thereby fixing said fiber introduction portion and said fiber fixing portion such that said corresponding fiber introduction grooves and said first holes of said fiber fixing portion align.

18. An optical switch for selectively coupling optical fibers, comprising:
an optical fiber arranging member, including
a fiber fixing portion for receiving and arranging a plurality of first optical fibers, each first optical fiber having an end portion, and
a fiber introduction portion having fiber introduction grooves therein for receiving at least one second optical fiber, said second optical fiber having a distal end portion,
means for inserting longitudinally said second optical fiber to any selected fiber introduction groove for conveying longitudinally said second optical fiber distal end along said fiber introduction groove to a selected first optical fiber to optically couple said second optical fiber with said selected first optical fiber,
wherein said fiber introduction grooves are arranged parallel to each other;
wherein said fiber fixing portion has a plurality of fiber fixing grooves therein, said fiber fixing grooves being arranged parallel to each other; and
wherein said fiber arranging member has a slit therein, said slit located between said fiber fixing portion and said fiber introduction portion and extending in a direction perpendicular to a longitudinal direction of said fiber fixing grooves, wherein said first optical fibers are fixed in said fiber fixing grooves such that said first optical fiber end faces oppose said fiber introduction grooves.

19. An optical switch as recited in claim 18, further comprising:
a plurality of stages of optical fiber arranging members provided at a predetermined stacking interval,
wherein said optical switch includes said means for inserting longitudinally said second optical fiber to any selected fiber introduction groove at any of said plurality of stages.

20. An optical switch as recited in claim 18, wherein said fiber arranging member has a slit extending deeper into said fiber arranging member than said fiber fixing grooves and said fiber introduction grooves.

21. An optical switch as recited in claim 18, wherein said second optical fiber distal end is positioned in said slit and does not physically contact said first optical fibers.

22. An optical switch as recited in claim 18, further comprising a condenser lens provided at said second optical fiber distal end, wherein said condenser lens is positioned in said slit.

23. An optical switch as recited in claim 18, wherein said second optical fiber distal end is spherically formed by heat fusion.

* * * * *